(12) United States Patent
Yamada

(10) Patent No.: US 8,982,407 B2
(45) Date of Patent: Mar. 17, 2015

(54) IMAGE PROCESSING USING PIXEL REPLACEMENT

(71) Applicant: Canon Kabushiki Kaisha, Tokyo (JP)

(72) Inventor: Michihiko Yamada, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/944,331

(22) Filed: Jul. 17, 2013

(65) Prior Publication Data

US 2014/0036278 A1 Feb. 6, 2014

(30) Foreign Application Priority Data

Aug. 1, 2012 (JP) ................. 2012-170742

(51) Int. Cl.
*G06K 15/02* (2006.01)
*H04N 1/405* (2006.01)
*H04N 1/40* (2006.01)

(52) U.S. Cl.
CPC ........ *G06K 15/1843* (2013.01); *H04N 1/40018* (2013.01); *H04N 1/40068* (2013.01); *H04N 1/405* (2013.01)
USPC ............ 358/1.2; 358/1.9; 358/3.27; 358/525; 382/267; 382/300

(58) Field of Classification Search
CPC ..... H04N 9/045; H04N 13/04; H04N 1/4052; H04N 13/40018; H04N 13/40068; H04N 13/405; G06K 15/1843; G06K 2209/29
USPC ............ 358/1.2, 1.9, 3.27, 525; 382/267, 300
See application file for complete search history.

(56) References Cited

U.S. PATENT DOCUMENTS

| 6,333,998 | B1* | 12/2001 | Matsumoto | 382/217 |
| 2004/0010633 | A1* | 1/2004 | Ishikawa | 710/1 |
| 2009/0225373 | A1* | 9/2009 | Moriwaki | 358/3.27 |
| 2010/0302413 | A1* | 12/2010 | Kawashima | 348/241 |

FOREIGN PATENT DOCUMENTS

| JP | H11-308461 | 11/1999 |
| JP | 2007-208368 A | 8/2007 |

OTHER PUBLICATIONS

Japanese Office Action dated Jul. 15, 2014 in Japanese Application No. 2012-170742.

* cited by examiner

*Primary Examiner* — Jacky X Zheng
(74) *Attorney, Agent, or Firm* — Fitzpatrick, Cella, Harper & Scinto

(57) ABSTRACT

The prior art has such a problem that image quality degrades because dots are conspicuous in the case where the size of each dot is not so small and the black or white dots are regularly aligned, in particular, in a bright part close to white or in a dark part close to black. It is determined whether a black or white pixel exists at a point-symmetric position with respect to a notice pixel using pattern matching for a binarized image and in the case where a pixel exists at the point-symmetric position, the notice pixel is replaced with a specific output pattern.

10 Claims, 26 Drawing Sheets

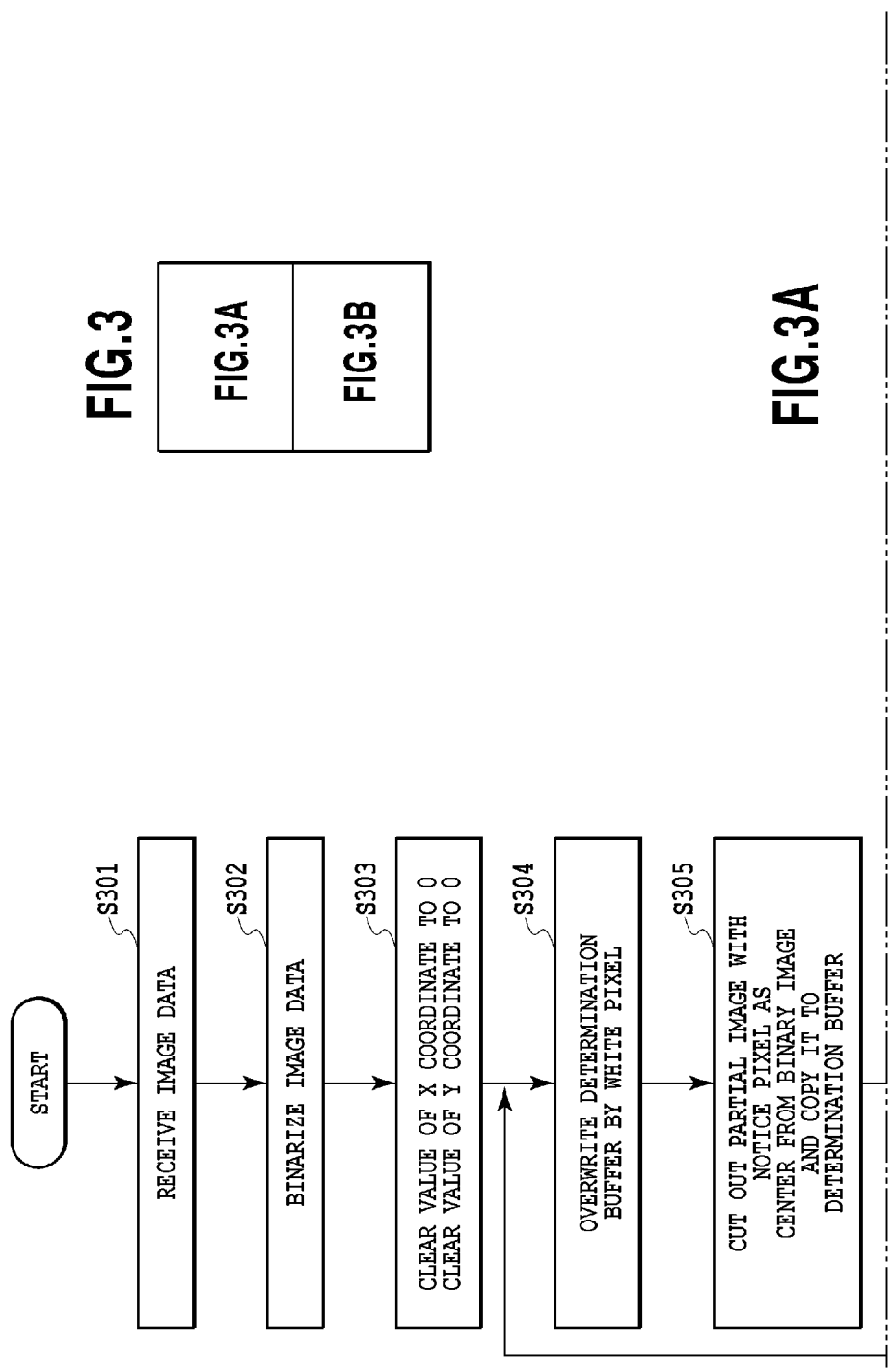

| 104 | 48 | 56 | 112 | 143 | 199 | 191 | 135 | 106 | 50 | 58 | 114 | 145 | 201 | 193 | 137 |
|---|---|---|---|---|---|---|---|---|---|---|---|---|---|---|---|
| 40 | 0 | 8 | 64 | 207 | 247 | 239 | 183 | 42 | 2 | 10 | 66 | 209 | 249 | 241 | 185 |
| 32 | 24 | 16 | 72 | 215 | 223 | 231 | 175 | 34 | 26 | 18 | 74 | 217 | 225 | 233 | 177 |
| 96 | 88 | 80 | 120 | 151 | 159 | 167 | 127 | 98 | 90 | 82 | 122 | 153 | 161 | 169 | 129 |
| 147 | 203 | 195 | 139 | 108 | 52 | 60 | 116 | 149 | 205 | 197 | 141 | 110 | 54 | 62 | 118 |
| 211 | 251 | 243 | 187 | 44 | 4 | 12 | 68 | 213 | 253 | 245 | 189 | 46 | 6 | 14 | 70 |
| 219 | 227 | 235 | 179 | 36 | 28 | 20 | 76 | 221 | 229 | 237 | 181 | 38 | 30 | 22 | 78 |
| 155 | 163 | 171 | 131 | 100 | 92 | 84 | 124 | 157 | 165 | 173 | 133 | 102 | 94 | 86 | 126 |
| 107 | 51 | 59 | 115 | 146 | 202 | 194 | 138 | 105 | 49 | 57 | 113 | 144 | 200 | 192 | 136 |
| 43 | 3 | 11 | 67 | 210 | 250 | 242 | 186 | 41 | 1 | 9 | 65 | 208 | 248 | 240 | 184 |
| 35 | 27 | 19 | 75 | 218 | 226 | 234 | 178 | 33 | 25 | 17 | 73 | 216 | 224 | 232 | 176 |
| 99 | 91 | 83 | 123 | 154 | 162 | 170 | 130 | 97 | 89 | 81 | 121 | 152 | 160 | 168 | 128 |
| 150 | 206 | 198 | 142 | 111 | 55 | 63 | 119 | 148 | 204 | 196 | 140 | 109 | 53 | 61 | 117 |
| 214 | 254 | 246 | 190 | 47 | 7 | 15 | 71 | 212 | 252 | 244 | 188 | 45 | 5 | 13 | 69 |
| 222 | 230 | 238 | 182 | 39 | 31 | 23 | 79 | 220 | 228 | 236 | 180 | 37 | 29 | 21 | 77 |
| 158 | 166 | 174 | 134 | 103 | 95 | 87 | 127 | 156 | 164 | 172 | 132 | 101 | 93 | 85 | 125 |

FIG.5A

| 113 | 56 | 85 | 127 | 183 | 155 | 118 | 62 | 90 | 132 | 189 | 160 | 114 | 58 | 86 | 128 | 185 | 156 | 119 | 63 | 91 | 134 | 190 | 162 |
|---|---|---|---|---|---|---|---|---|---|---|---|---|---|---|---|---|---|---|---|---|---|---|---|
| 70 | 0 | 14 | 169 | 240 | 226 | 76 | 5 | 19 | 175 | 245 | 231 | 72 | 1 | 15 | 171 | 241 | 227 | 77 | 7 | 21 | 176 | 246 | 232 |
| 99 | 28 | 42 | 141 | 212 | 197 | 104 | 33 | 48 | 146 | 217 | 203 | 100 | 29 | 44 | 142 | 213 | 199 | 105 | 35 | 49 | 148 | 218 | 204 |
| 134 | 190 | 162 | 120 | 63 | 92 | 139 | 196 | 168 | 125 | 69 | 97 | 135 | 192 | 164 | 121 | 65 | 93 | 141 | 197 | 169 | 127 | 70 | 98 |
| 176 | 247 | 233 | 78 | 7 | 21 | 182 | 252 | 238 | 83 | 12 | 26 | 178 | 248 | 234 | 79 | 8 | 22 | 183 | 254 | 239 | 84 | 14 | 28 |
| 148 | 219 | 205 | 106 | 35 | 49 | 153 | 224 | 210 | 111 | 41 | 55 | 149 | 220 | 206 | 107 | 37 | 51 | 155 | 225 | 211 | 112 | 42 | 56 |
| 116 | 60 | 88 | 130 | 187 | 159 | 115 | 58 | 86 | 129 | 185 | 157 | 118 | 61 | 89 | 132 | 188 | 160 | 116 | 59 | 88 | 130 | 186 | 158 |
| 74 | 3 | 18 | 173 | 243 | 229 | 72 | 2 | 16 | 171 | 242 | 227 | 75 | 5 | 19 | 174 | 245 | 231 | 74 | 3 | 17 | 172 | 243 | 229 |
| 102 | 32 | 46 | 145 | 215 | 201 | 100 | 30 | 44 | 143 | 213 | 199 | 104 | 33 | 47 | 146 | 216 | 202 | 102 | 31 | 45 | 144 | 215 | 201 |
| 138 | 194 | 166 | 123 | 67 | 95 | 136 | 192 | 164 | 122 | 65 | 93 | 139 | 195 | 167 | 125 | 68 | 97 | 137 | 194 | 165 | 123 | 67 | 95 |
| 180 | 250 | 236 | 81 | 11 | 25 | 178 | 249 | 235 | 79 | 9 | 23 | 181 | 252 | 238 | 82 | 12 | 26 | 179 | 250 | 236 | 81 | 10 | 24 |
| 152 | 222 | 208 | 109 | 39 | 53 | 150 | 220 | 206 | 108 | 37 | 51 | 153 | 224 | 209 | 111 | 40 | 54 | 151 | 222 | 208 | 109 | 38 | 52 |
| 114 | 57 | 85 | 128 | 184 | 156 | 119 | 63 | 91 | 133 | 190 | 161 | 113 | 57 | 85 | 127 | 184 | 156 | 119 | 62 | 90 | 133 | 189 | 161 |
| 71 | 1 | 15 | 170 | 241 | 227 | 77 | 6 | 20 | 175 | 246 | 232 | 71 | 0 | 14 | 170 | 240 | 226 | 76 | 6 | 20 | 175 | 246 | 231 |
| 100 | 29 | 43 | 142 | 212 | 198 | 105 | 34 | 48 | 147 | 218 | 204 | 99 | 29 | 43 | 141 | 212 | 198 | 104 | 34 | 48 | 147 | 217 | 203 |
| 135 | 191 | 163 | 121 | 64 | 93 | 140 | 197 | 168 | 126 | 70 | 98 | 134 | 191 | 163 | 120 | 64 | 92 | 140 | 196 | 168 | 126 | 69 | 97 |
| 177 | 248 | 234 | 78 | 8 | 22 | 183 | 253 | 239 | 84 | 13 | 27 | 177 | 247 | 233 | 78 | 7 | 22 | 182 | 253 | 239 | 83 | 13 | 27 |
| 149 | 220 | 205 | 107 | 36 | 50 | 154 | 225 | 211 | 112 | 41 | 56 | 149 | 219 | 205 | 106 | 36 | 50 | 154 | 224 | 210 | 112 | 41 | 55 |
| 117 | 61 | 89 | 131 | 188 | 160 | 115 | 59 | 87 | 130 | 186 | 158 | 117 | 60 | 89 | 131 | 187 | 159 | 115 | 59 | 87 | 129 | 186 | 157 |
| 75 | 4 | 18 | 174 | 244 | 230 | 73 | 3 | 17 | 172 | 242 | 228 | 74 | 4 | 18 | 173 | 244 | 230 | 73 | 2 | 16 | 171 | 242 | 228 |
| 103 | 33 | 47 | 145 | 216 | 202 | 101 | 31 | 45 | 144 | 214 | 200 | 103 | 32 | 46 | 145 | 216 | 201 | 101 | 30 | 44 | 143 | 214 | 200 |
| 138 | 195 | 167 | 124 | 68 | 96 | 137 | 193 | 165 | 123 | 66 | 94 | 138 | 194 | 166 | 124 | 67 | 96 | 136 | 193 | 164 | 122 | 66 | 94 |
| 181 | 251 | 237 | 82 | 11 | 26 | 179 | 250 | 235 | 80 | 10 | 24 | 180 | 251 | 237 | 82 | 11 | 25 | 179 | 249 | 235 | 80 | 9 | 23 |
| 153 | 223 | 209 | 110 | 40 | 54 | 151 | 221 | 207 | 108 | 38 | 52 | 152 | 223 | 209 | 110 | 39 | 53 | 150 | 221 | 207 | 108 | 37 | 52 |

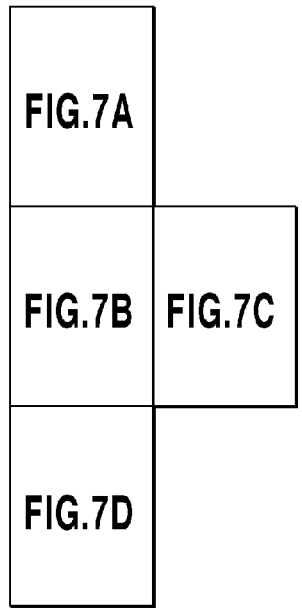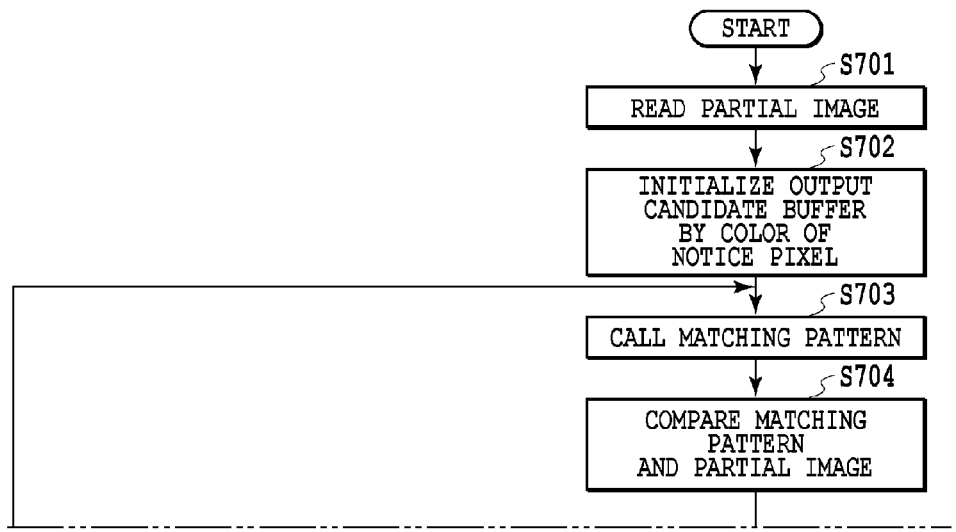

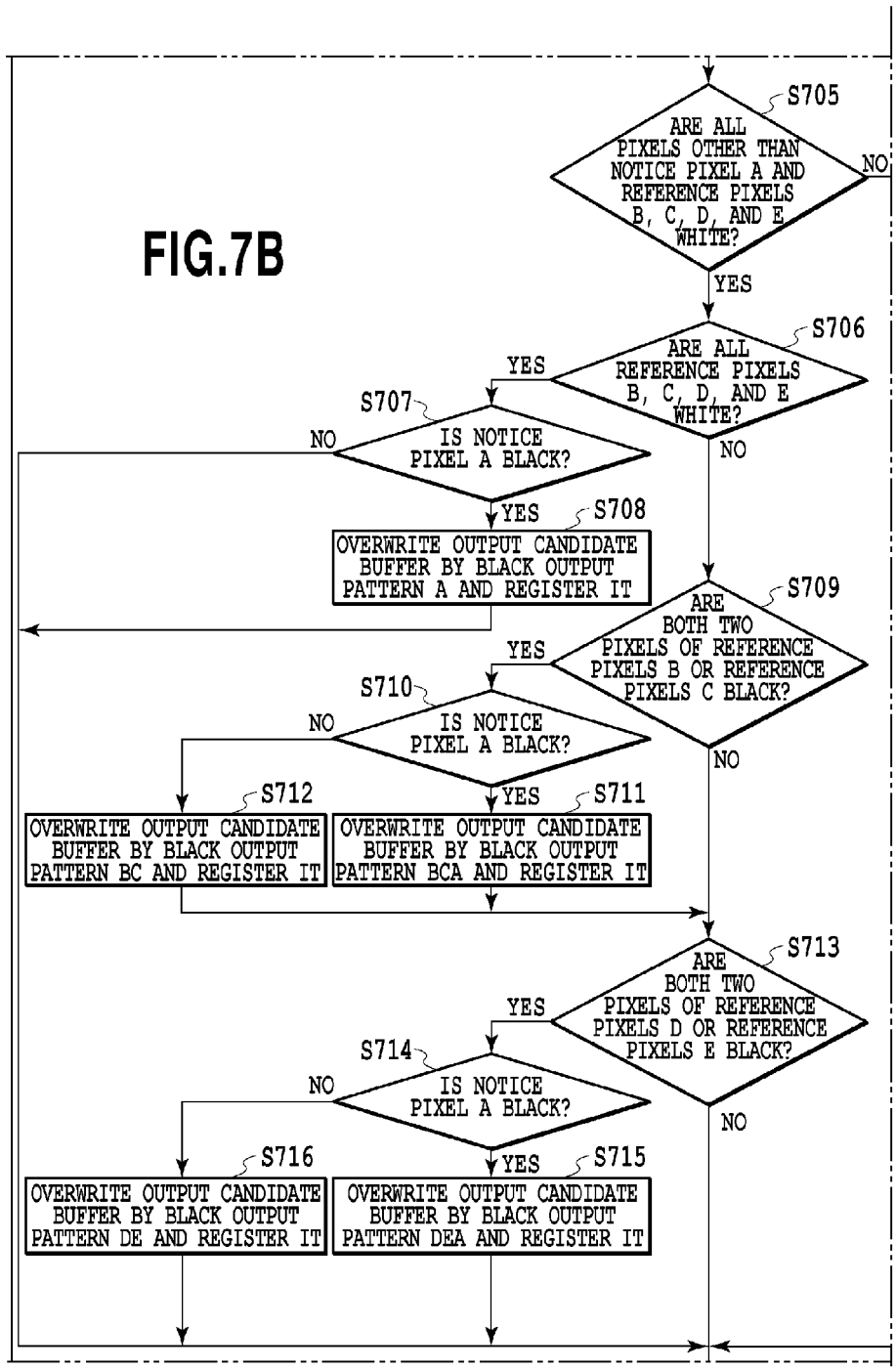

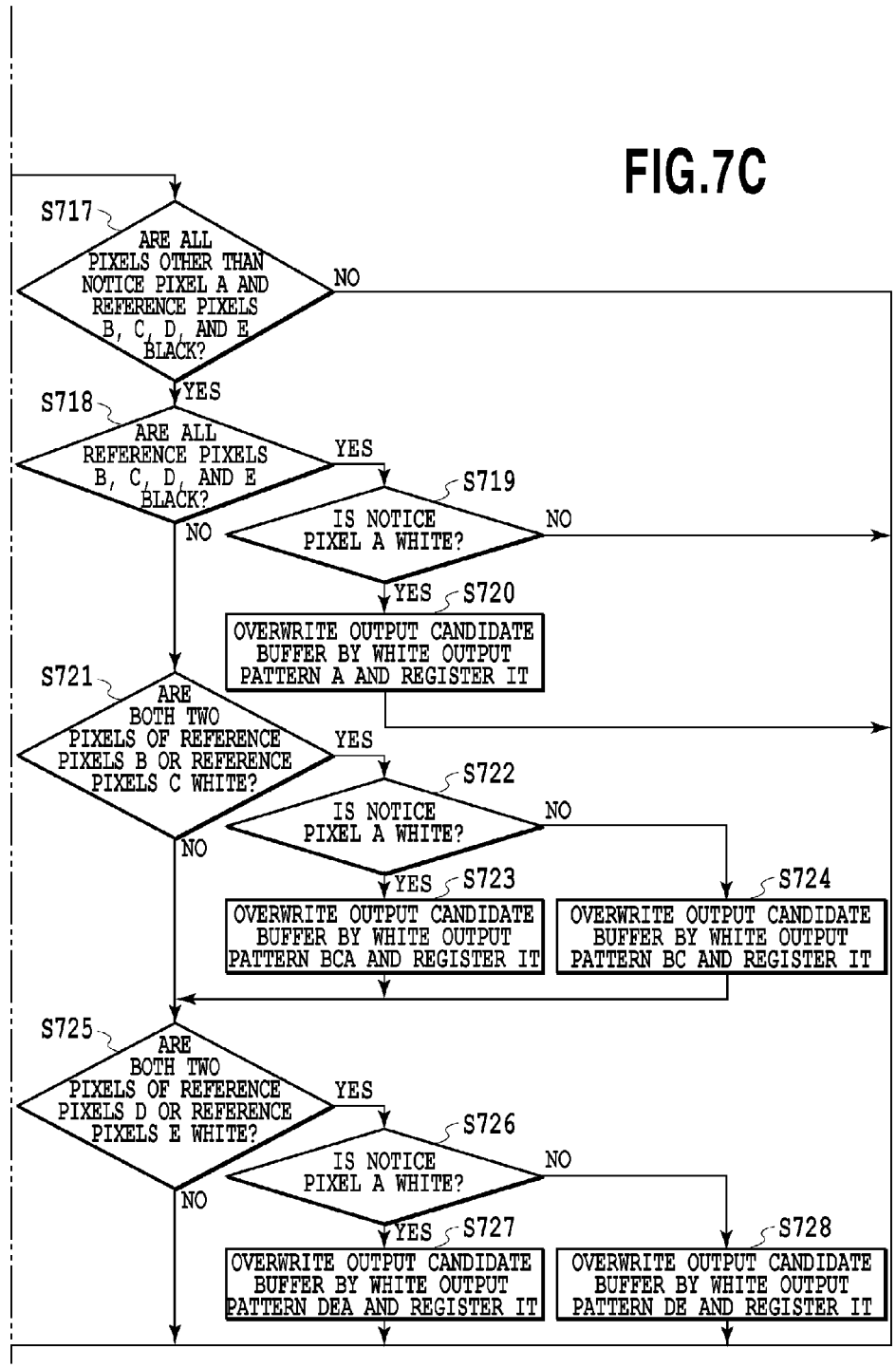

| | |
|---|---|
| BLACK OUTPUT PATTERN A |  |
| BLACK OUTPUT PATTERN BC |  |
| BLACK OUTPUT PATTERN BCA |  |
| BLACK OUTPUT PATTERN DE |  |
| BLACK OUTPUT PATTERN DEA |  |
| BLACK DEFAULT |  |
| WHITE OUTPUT PATTERN A |  |
| WHITE OUTPUT PATTERN BC |  |
| WHITE OUTPUT PATTERN BCA |  |
| WHITE OUTPUT PATTERN DE |  |
| WHITE OUTPUT PATTERN DEA |  |
| WHITE DEFAULT |  |

| | |
|---|---|
| BLACK OUTPUT PATTERN A |  |
| BLACK OUTPUT PATTERN BC |  |
| BLACK OUTPUT PATTERN BCA |  |
| BLACK OUTPUT PATTERN DE |  |
| BLACK OUTPUT PATTERN DEA |  |
| BLACK DEFAULT |  |
| WHITE OUTPUT PATTERN A |  |
| WHITE OUTPUT PATTERN BC |  |
| WHITE OUTPUT PATTERN BCA |  |
| WHITE OUTPUT PATTERN DE |  |
| WHITE OUTPUT PATTERN DEA |  |
| WHITE DEFAULT |  |

| | |
|---|---|
| BLACK OUTPUT PATTERN A | ■ |
| BLACK OUTPUT PATTERN BC | ⊞ |
| BLACK OUTPUT PATTERN BCA | ■ |
| BLACK OUTPUT PATTERN DE | ⊞ |
| BLACK OUTPUT PATTERN DEA | ■ |
| BLACK DEFAULT | ■ |
| WHITE OUTPUT PATTERN A | ⊞ |
| WHITE OUTPUT PATTERN BC | ■ |
| WHITE OUTPUT PATTERN BCA | ⊞ |
| WHITE OUTPUT PATTERN DE | ■ |
| WHITE OUTPUT PATTERN DEA | ⊞ |
| WHITE DEFAULT | ⊞ |

FIG.16

IMAGE PROCESSING USING PIXEL REPLACEMENT

BACKGROUND OF THE INVENTION

1. Field of the Invention

The present invention relates to image processing to increase the resolution of an output image higher than that of an input image in an image having been subjected to pseudo halftone processing, such as a dither matrix.

2. Description of the Related Art

Conventionally, in an image forming device capable of producing a binary output to specify to print a dot or not, a halftone of a natural image etc. is reproduced by performing pseudo halftone processing, such as error diffusion and a dither matrix, on a multi-valued image. In the case where a halftone is reproduced by concentrating dots by a dither matrix, normally it is unlikely that texture becomes conspicuous even in the case where isolated points (dots) are regularly aligned. However, in the case where each dot is not so small, in particular, in a bright part close to white (low-density part) or in a dark part close to black (high-density part), there has been such a problem that dots are regularly aligned to be conspicuous, and therefore the image quality degrades inevitably for the multi-valued output with the same resolution.

It has been possible to cope with the problem of image quality degradation by increasing the output resolution. However, since as the resolution increases, the more storage capacity is required and the precision required for the device increases, and therefore it becomes extremely difficult to cope with the problem also technically, which causes a new problem of cost increase.

For example, in electrophotography, a development method in which a potential difference is made by laser irradiation and toner is attracted thereto is used. This is converted into a binary image (image in which a dot is printed or not) using a dither matrix to represent an image. In this case, the shape of a laser spot is circular and larger than a dot generated by a dither matrix, and therefore, in the case where positions neighboring one another are irradiated with the laser, there is a possibility that the laser spots overlap one another and the peaks of potential gather to produce a large peak suddenly. For example, it is known that in the case where a dot of 2×2 pixels is formed, the four spots gather and the peak of potential becomes large suddenly. Such a dot of 2×2 pixels is formed, for example, by simply enlarging a dot in order to match the resolution in the case where an image formed by 600 dpi is output to an electrophotographic device having an engine of 1,200 dpi.

In order to cope with this, a method is proposed, in which an isolated pixel is divided into smaller pixels while preventing the area thereof from changing in the case where an output is produced with an increased resolution, the divided pixels are arranged separate from one another, and thereby the gathering of the laser spots is lessened and dots are made less conspicuous (for example, see Japanese Patent Laid-Open No. H11-308461 (1999)).

However, with the method described in the above-mentioned Japanese Patent Laid-Open No. H11-308461 (1999), there is a case where the divided pixels are connected to one another in the case of a strong laser spot and the effect that dots are made less conspicuous is lessened. There is also a case where even though the divided pixels are not connected to one another, the dots exist close to one another, and therefore, the dots are viewed as one dot through the human eyes and are eventually conspicuous.

SUMMARY OF THE INVENTION

The image processing device according to the present invention includes: a point-symmetry determination unit configured to determine whether or not a black or white pixel exists at a point-symmetric position with respect to a notice pixel of a binary image obtained by performing screen processing on input image data; and a pixel replacement unit configured to replace the notice pixel with an output pattern with a resolution higher than that of the input image data in accordance with a determination result by the point-symmetry determination unit.

According to the present invention, it is possible to prevent the above-mentioned problem from occurring in an image to be output.

Further features of the present invention will become apparent from the following description of exemplary embodiments (with reference to the attached drawings).

BRIEF DESCRIPTION OF THE DRAWINGS

FIG. 4 is an example of input image data with the pixel value being set to one (K=1);

Figure 5C:
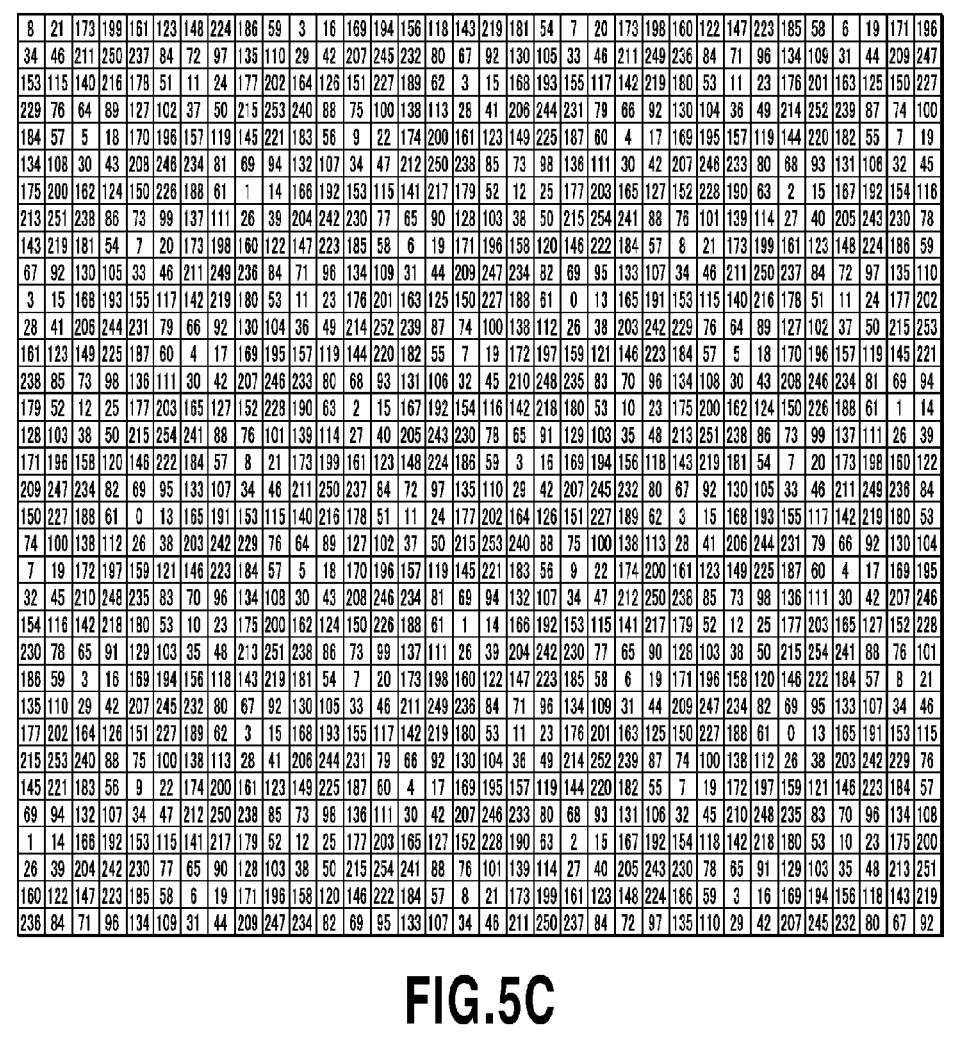
Figure 5D:
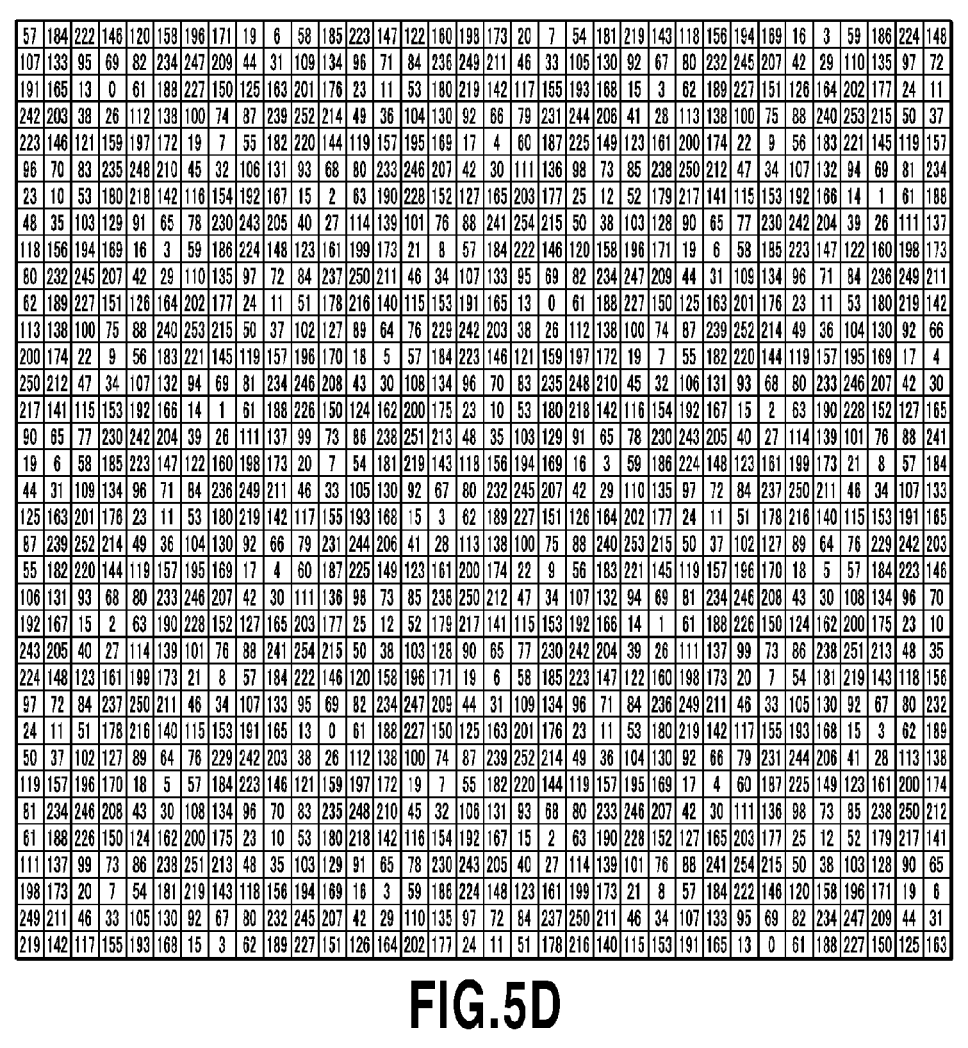

FIG. 5A is a diagram showing an example of a dither pattern;

FIG. 5B is a diagram showing an example of a dither pattern;

FIG. 5C is a diagram showing an example of a dither pattern;

FIG. 5D is a diagram showing an example of a dither pattern;

FIG. 7 is a diagram showing a relationship among FIGS. 7A to 7D, and FIGS. 7A to 7D are flowcharts showing a flow of point-symmetry determination processing and pixel replacement processing;

FIG. 12 is an example of input image data with the pixel value being set to two;

FIG. 13 is a diagram showing an example of a dither pattern;

FIG. 16 is an example of an output pattern table according to a third embodiment.

DESCRIPTION OF THE EMBODIMENTS (First Embodiment)

Figure 1:
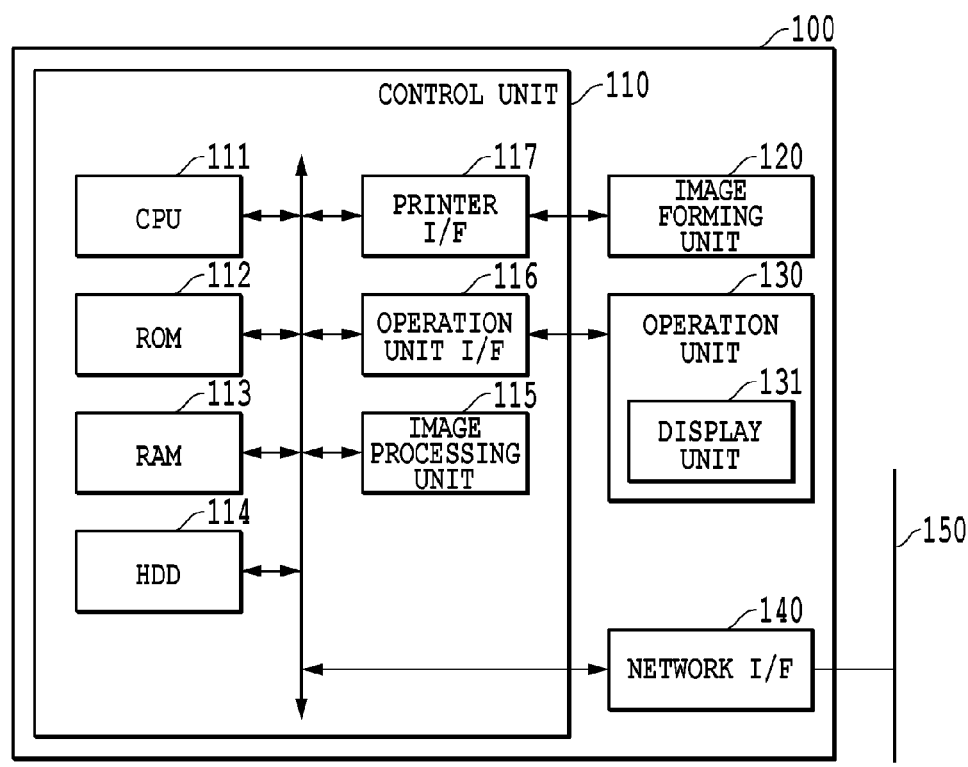
FIG. 1 is a block diagram showing main components of a printer as an image forming device.

FIG. 1 is a block diagram showing main components of a printer as an image forming device according to the present embodiment.

An image forming device 100, which is a printer, includes a control unit 110, an image forming unit 120, an operation unit 130, and a network I/F 140.

The control unit 110 includes a CPU 111, a ROM 112, a RAM 113, an HDD 114, an image processing unit 115, an operation unit I/F 116, and a printer I/F 117.

The processor (CPU) 111 that totally controls each unit reads control programs stored in the ROM 112 and performs various kinds of control processing, such as print control.

The ROM 112 stores various kinds of commands (OS, application programs, etc.) executed in the CPU 111.

The RAM 113 is used as a main memory and a temporary storage region, such as a work area, of the CPU 111.

The HDD 114 is a hard disk drive used as a storage region of programs read onto the RAM 113, execution results, etc.

The image processing unit 115 performs necessary image processing on acquired image data. Details of image processing will be described later.

The operation unit I/F 116 interfaces with the operation unit 130 for a user to give and perform various kinds of instructions and operations.

The printer I/F 117 interfaces with the image forming unit 120.

The image forming unit 120 performs processing to form a color image on a recording medium, such as paper, based on image-processed image data.

The operation unit 130 with which a user gives and performs various kinds of instructions and operations includes a keyboard and various kinds of switches, or touch panel type LCD display unit, etc. Information input through the operation unit 130 is sent to the CPU 111 via the operation unit I/F 116 and subjected to desired processing, and the processing result etc. is displayed on a display unit 131 provided within the operation unit 130.

The network I/F 140 interfaces with a network 150, such as LAN. The image forming device 100 is connected with a computer etc. (not shown schematically) on the network 150 via the network I/F 140.

The image forming device 100 is not limited to the printer, and for example, a digital multi function peripheral including the functions as copier, a scanner and FAX may be used.

The image forming device 100 acquires image data, which is a target of image formation, in a variety of ways. For example, it may also be possible for a user to create image data on a predetermined application by operating the operation unit 130, or to acquire image data created by a PC etc. via the network 150. Further, in the case where there is provided a mechanism to read detachable storage media, such as a magnetic disc and optical disc, it may also be possible to acquire image data via the storage media. Furthermore, in the case where an image reading device, such as a scanner, is incorporated (or connected via a network), it may also be possible to acquire image data by reading a document etc. by the image reading device.

It may also be possible to configure the control unit 110 as an independent image processing device in addition to configuring as part of the image forming device as described above and to connect the image processing unit with a printer provided separately via the network 150.

Figure 2:
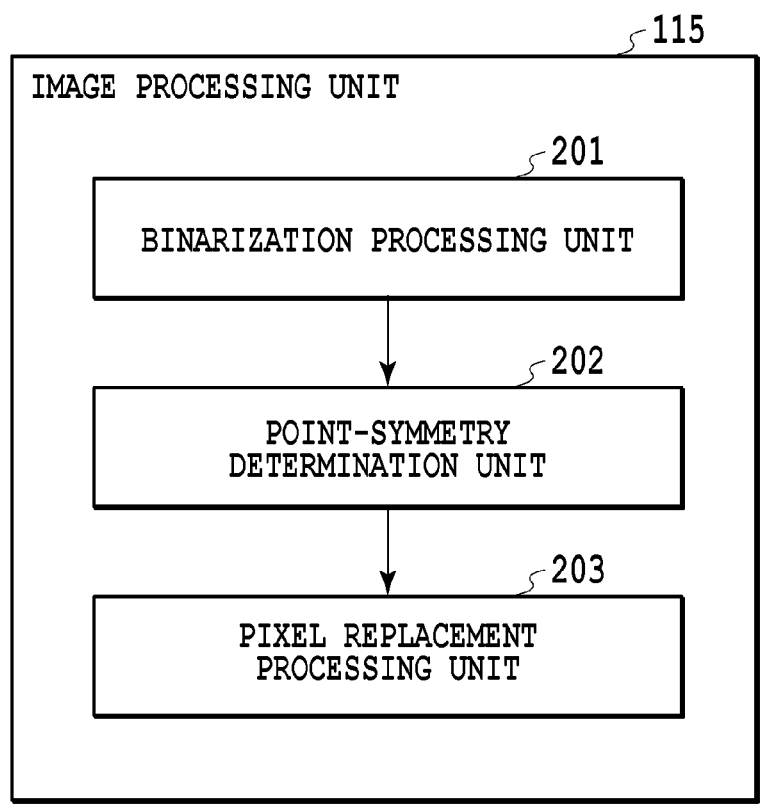
FIG. 2 is a block diagram showing an internal configuration of an image processing unit.

FIG. 2 is a block diagram showing an internal configuration of the image processing unit 115.

The image processing unit 115 includes a binarization processing unit 201, a point-symmetry determination unit 202, and a pixel replacement processing unit 203.

The binarization processing unit 201 binarizes input image data by screen processing.

The point-symmetry determination unit 202 checks the dot arrangement in the image binarized by the binarization processing unit 201 (hereinafter, referred to as a "binary image") and determines whether or not point-symmetry with respect to a notice pixel exists. In the present embodiment, by performing pattern matching on a binary image, it is determined whether or not a dot configured by black or white pixels exists at a point-symmetric position with respect to the notice pixel in the binary image.

The pixel replacement processing unit 203 performs processing to replace the notice pixel in the binary image with an output pattern with a resolution higher than that of the input image data in accordance with the determination result by the point-symmetry determination unit 202.

Figure 3B:
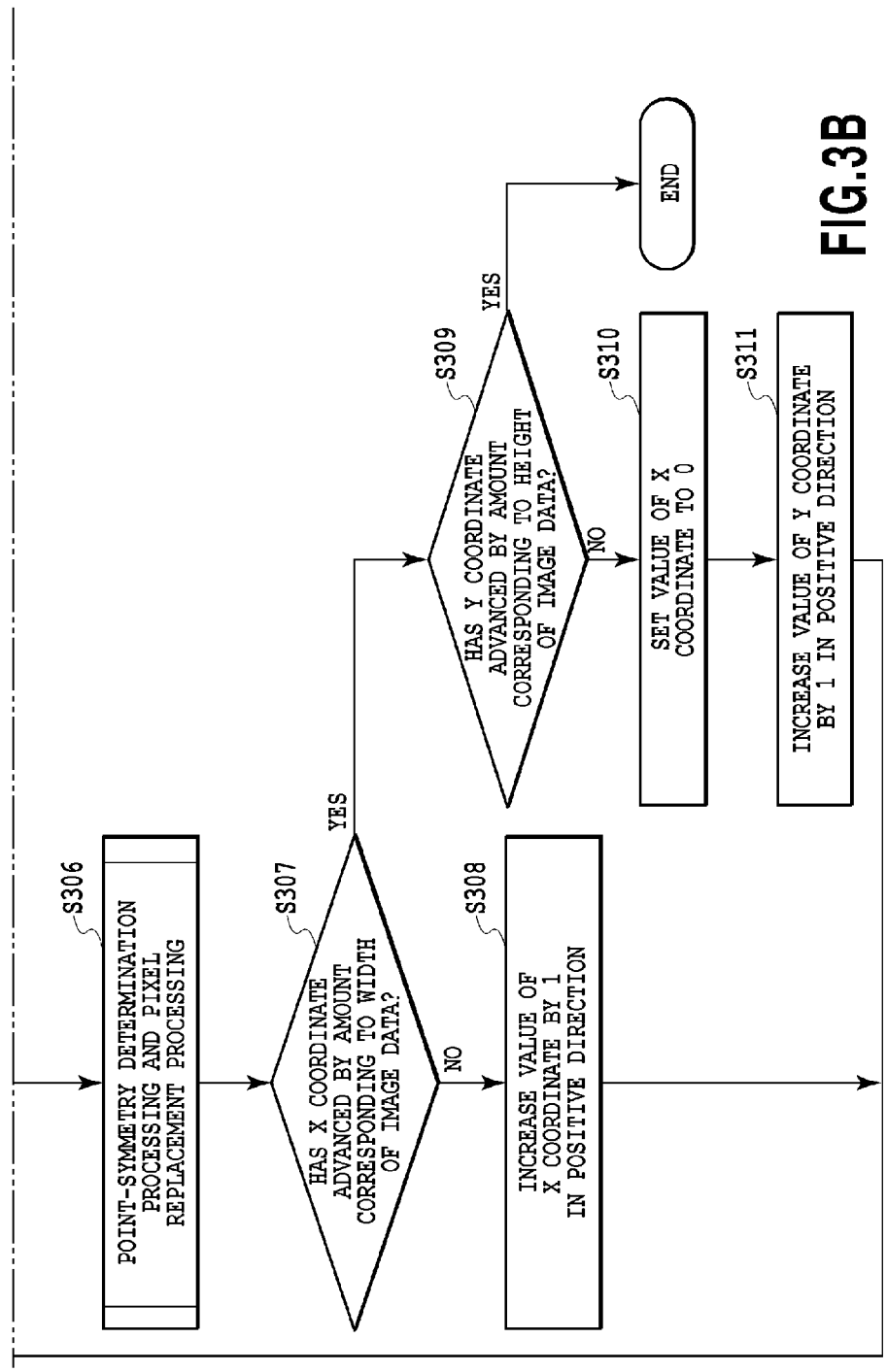
FIG. 3 is a diagram showing a relationship between FIGS. 3A and 3B, and FIGS. 3A and 3B are diagrams showing an image process in the image processing unit.

FIGS. 3A and 3B are flowcharts showing a flow of image processing in the image processing unit 115. Contents to be described below are achieved by programs stored in the HDD 114 etc. being read onto the RAM 113 and executed by the CPU 111.

Figure 4:
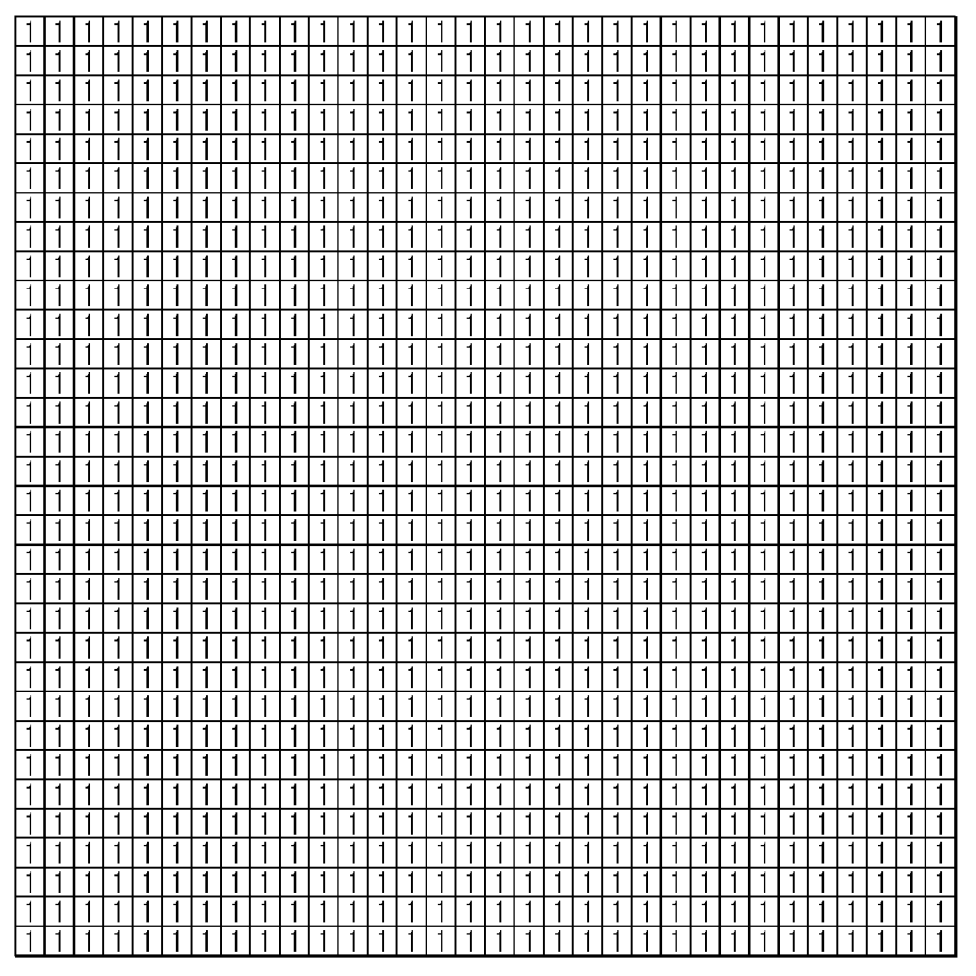

At step 301, the image processing unit 115 receives input image data. The input image data in this case is multi-valued digital image data converted into a density-linear image signal in order to match with the characteristics of the human eyes. One pixel in this digital image data is generally represented by 256 gradations (8 bits). FIG. 4 is an example of input image data in which all the pixel values are set to one (K=1) for convenience. In this case, the image will be a bright one in which black dots are interspersed in white. Similarly, in the case where all the pixel values are set to 254 (K=254), the image will be a dark one in which white dots are interspersed in black. The received input image data is stored in the RAM 113.

Figure 6A:
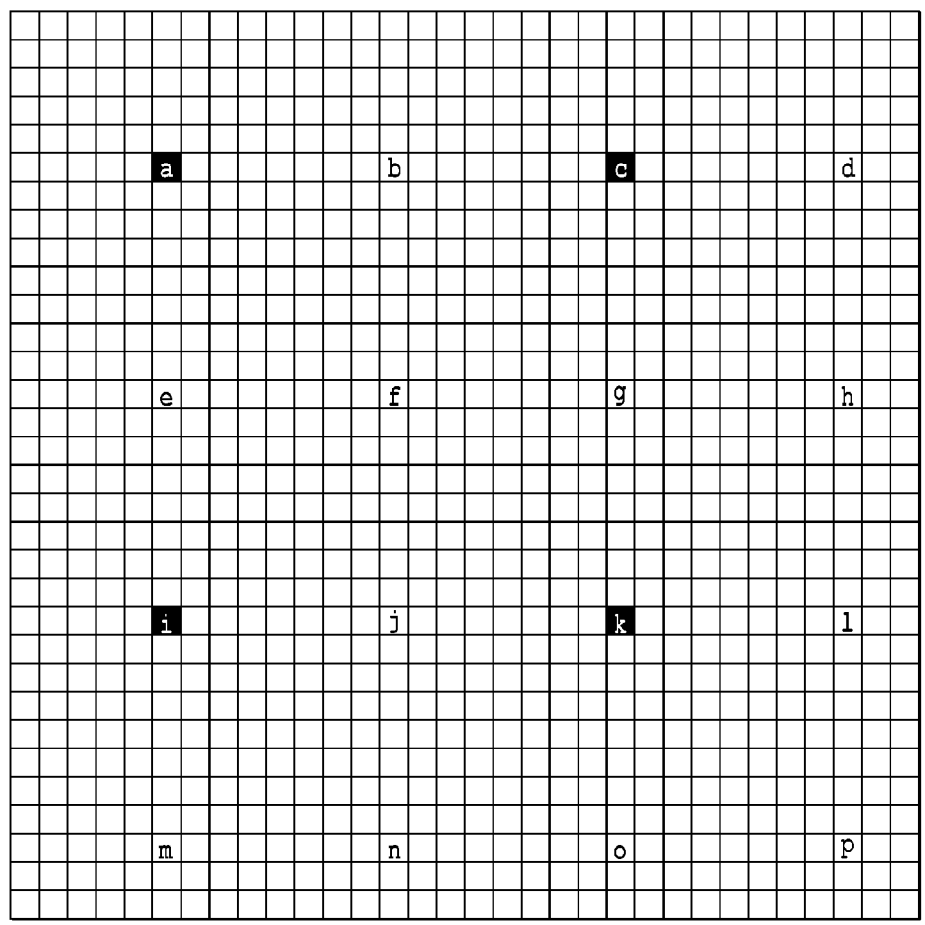
FIGS. 6A and 6B are diagrams showing an example of a binary image obtained by performing binarization processing on input image data.
Figure 6B:
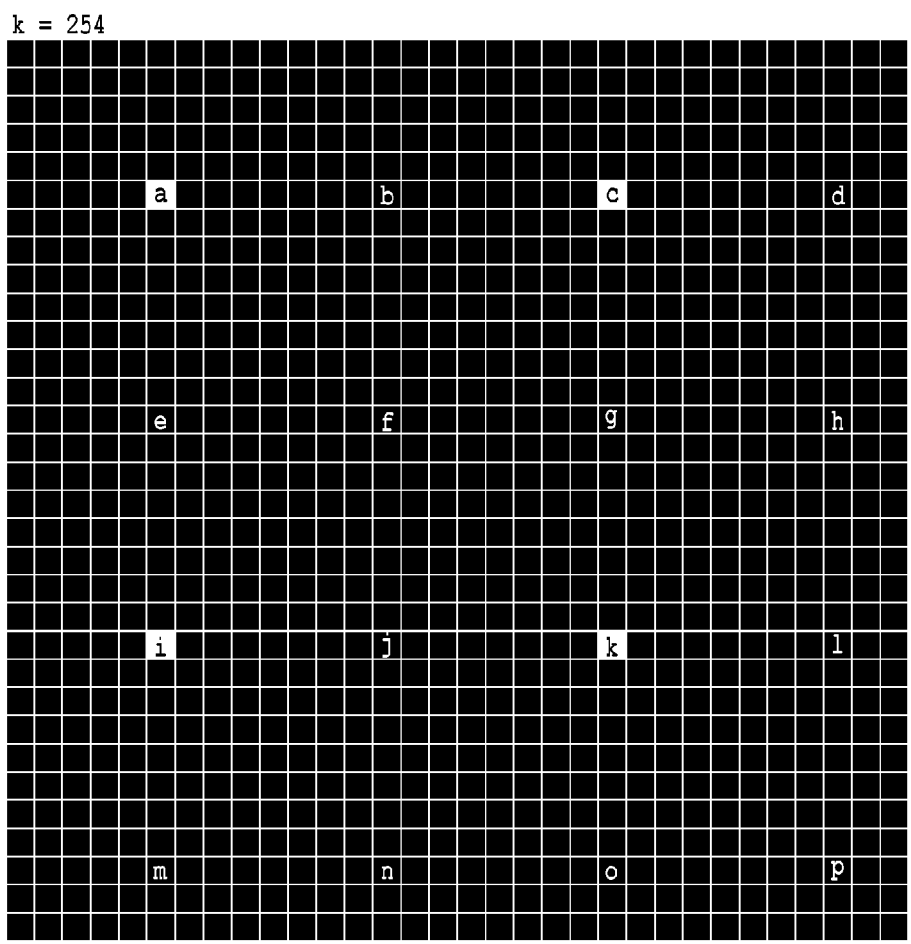
Figure 7D:
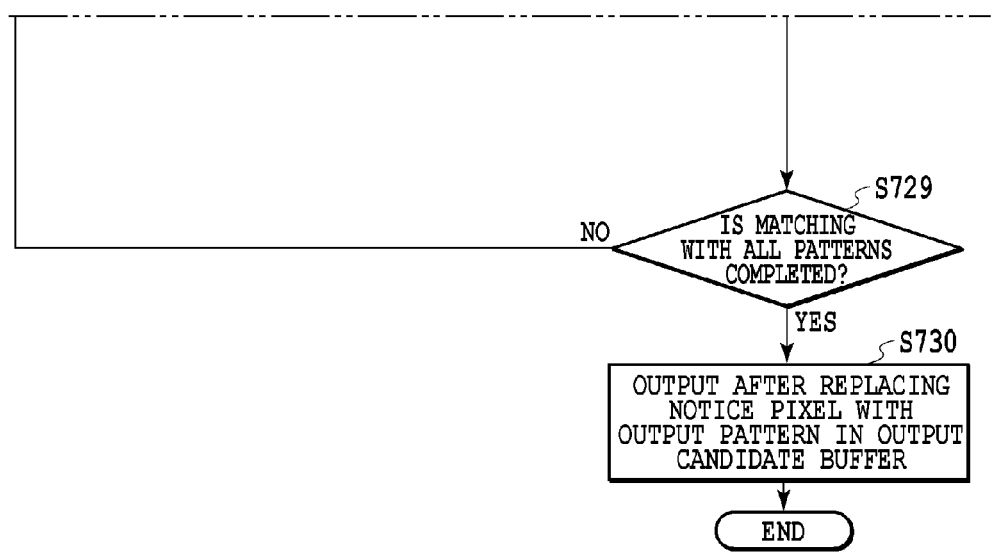
Figure 8A:
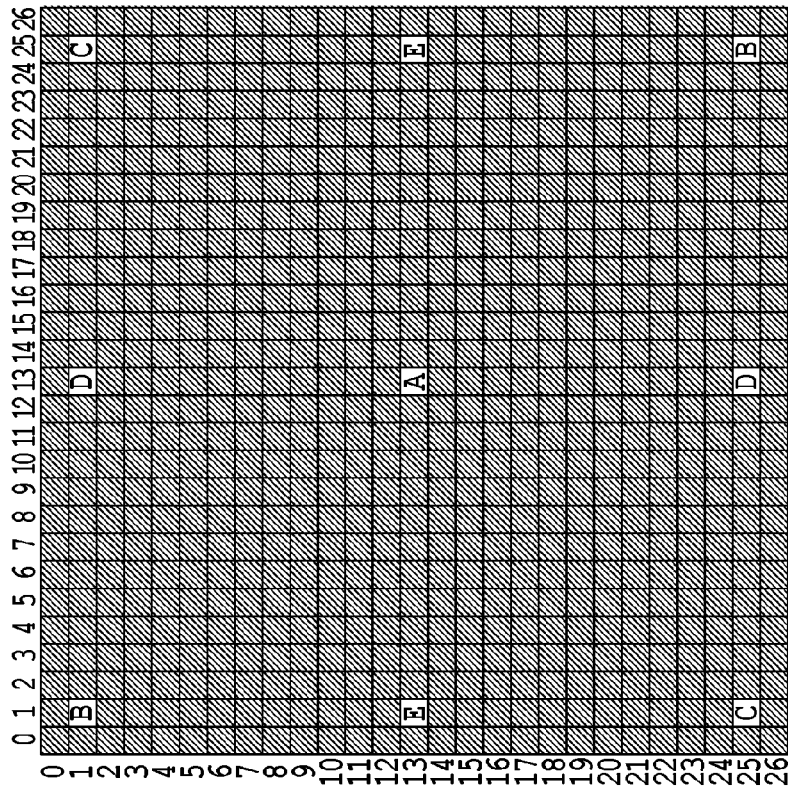
FIGS. 8A to 8D are diagrams showing matching pattern examples.
Figure 8B:
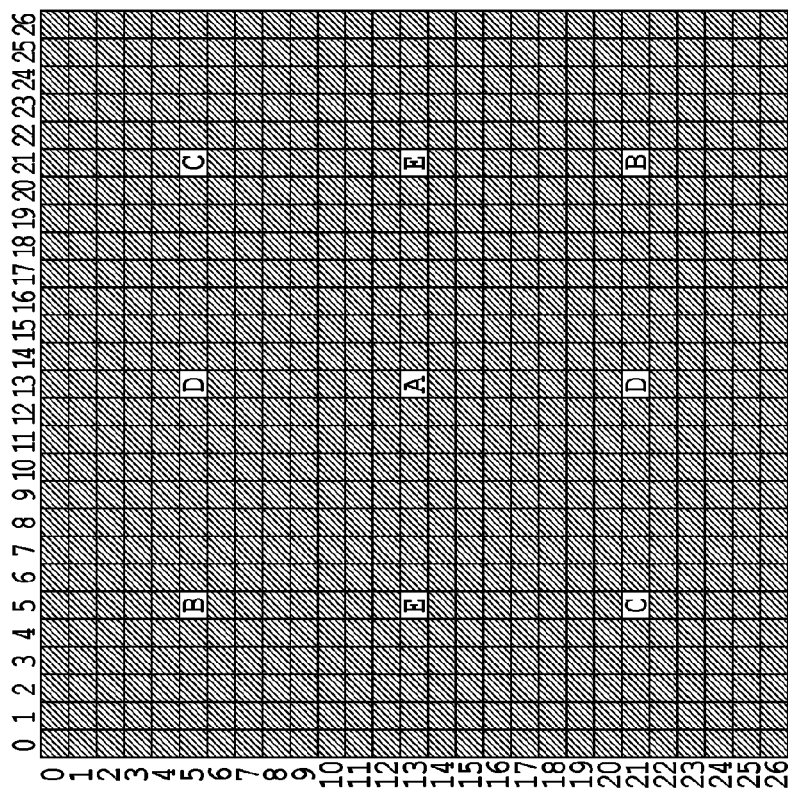
Figure 8D:
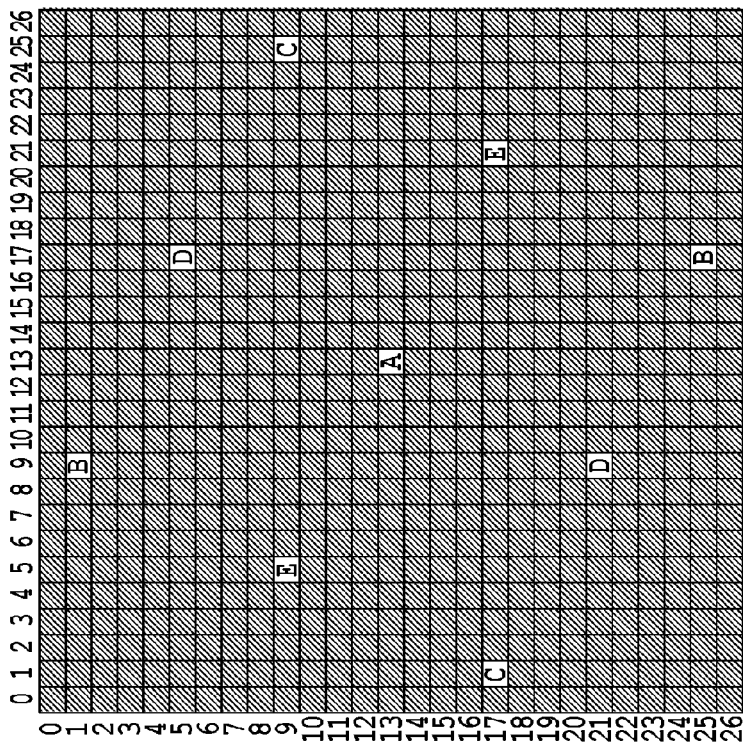
Figure 8C:
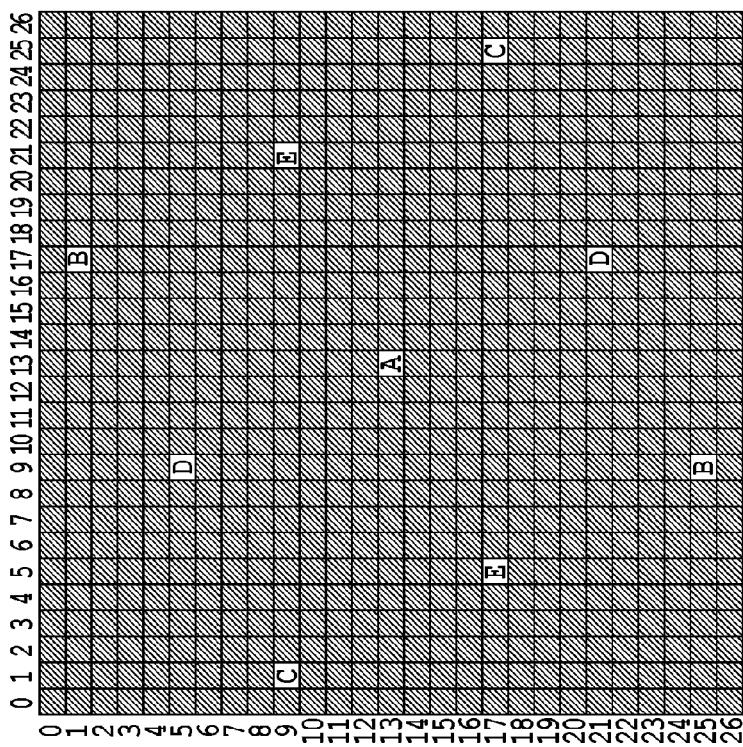

At step 302, the binarization processing unit 201 converts the input image data stored in the RAM 113 into a binary image using a dither pattern. FIGS. 5A to 5D are each an example of a dither pattern and each corresponds to a different number of screen lines. Specifically, FIG. 5A corresponds to 106 lines, FIG. 5B to 141 lines, FIG. 5C to 134 lines, and FIG. 5D to a 134-line mirror image, respectively. In the binarization processing, a pixel having a pixel value larger than the threshold value of the dither pattern is converted into ON (1) and a pixel having a pixel value equal to or less than the threshold value is converted into OFF (0). For example, in the case where the input image data shown in FIG. 4 is binarized by the dither pattern in FIG. 5A, only the pixel corresponding to a square 501 whose threshold value is "0" is converted into ON (1) and the pixels corresponding to squares having other threshold values are converted into OFF (0). Then, a binary image in which this pattern appears repeatedly (that is, black dots are arranged side by side at 15 pixel intervals) is obtained. FIGS. 6A and 6B show binary images, respectively, obtained by performing binarization processing on the input image data described above in the case where K=1 and K=254 using the dither pattern in FIG. 5A. It is seen that dots (pixels indicated by a, c, i, k) are arranged side by side at 15 pixel intervals from one another in any binary image. It is assumed that the actual binary image is represented by the repetition of the binary image shown in FIGS. 6A and 6B and is sufficiently large.

At step 303, the point-symmetry determination unit 202 resets the values of a coordinate (X, Y) indicating the position of a pixel (notice pixel) currently being processed, that is, sets them to (0, 0).

At step 304, the point-symmetry determination unit 202 overwrites a region of a predetermined size (hereinafter, referred to as a "determination buffer") on the RAM 113 by white pixels. In the present embodiment, a region with 27 vertical pixels and 27 horizontal pixels is set as a determination buffer. This is because that the distance between pixels in the screen representation of K=254 in which dots are conspicuous in the high-density part (or the screen representation of K=1 in which dots are conspicuous in the low-density part) is 24 pixels is taken into consideration in the case where the number of screen lines is 141. That is, the size of the determination buffer is set appropriately in accordance with the number of screen lines.

At step 305, the point-symmetry determination unit 202 cuts out a partial image (here, an image with 27 vertical pixels and 27 horizontal pixels) corresponding to the determination buffer with the coordinate (X, Y) of the notice pixel as a center from the binary image generated at step 302. Then, the cutout partial image is copied (stored) in the determination buffer. At this time, depending on the coordinate (X, Y) of the notice pixel, there may be a case where there is a pixel that cannot be obtained because the pixel is located outside the binary image as a result. In this case, the determination buffer is overwritten by white pixels (step 304), and therefore, all the pixels outside the binary image and which cannot be obtained are handled as white pixels.

At step 306, the point-symmetry determination unit 202 determines whether or not point-symmetry exists by comparing the partial image stored in the determination buffer with a matching pattern prepared in advance (pattern matching). Then, the pixel replacement processing unit 203 performs processing to replace the notice pixel with a high resolution output pattern prepared in advance in the case where point-symmetry is recognized. Details of point-symmetry determination processing and pixel replacement processing will be described later.

At step 307, the image processing unit 115 determines whether the coordinate X of the notice pixel has advanced by an amount corresponding to the width of the image data. In the case where it has advanced, the procedure proceeds to step 309 and in the case where not, the procedure proceeds to step 308, respectively.

At step 308, the image processing unit 115 increases the value of the coordinate X of the notice pixel by one in the positive direction. Then, the processing at step 304 and subsequent steps is repeated.

At step 309, the image processing unit 115 determines whether the coordinate Y of the notice pixel has advanced by an amount corresponding to the height of the image data. In the case where it has not advanced, the procedure proceeds to step 310 and in the case where it has advanced, this processing is exited.

At step 310, the image processing unit 115 resets the value of the coordinate X of the notice pixel (sets to zero) and the procedure proceeds to step 311.

At step 311, the image processing unit 115 increases the value of the coordinate Y of the notice pixel by one in the positive direction. Then, the processing at step 304 and subsequent steps is repeated.

In this manner, until all the pixels of the binary image are processed, the processing at step 304 and subsequent steps is repeated.

(Point-Symmetry Determination Processing and Pixel Replacement Processing)

FIGS. 7A to 7D are flowcharts showing a flow of point-symmetry determination processing and pixel replacement processing at step 306. Hereinafter, details are explained.

At step 701, the point-symmetry determination unit 202 reads the partial image stored in the determination buffer.

At step 702, the point-symmetry determination unit 202 initializes an output candidate buffer on the RAM 113 by filling in with the value (color) of the pixel (notice pixel) located at the center of the partial image. In this case, the size of the output candidate buffer depends on the output resolution. In the present embodiment, it is premised that the resolution of the input image is 600 dpi and the resolution of the output image data is 1,200 dpi, and therefore, the size of the output candidate buffer is 2×2 pixels. In the case where the resolution of the output image data is 1,800 dpi, the size of the output candidate buffer is set to 3×3 pixels as a result.

At step 703, the point-symmetry determination unit 202 reads one matching pattern from a plurality of matching patterns stored in the ROM 102.

Here, the matching pattern is explained. In FIGS. 8A to 8B, 801 to 804 each show an example of a matching pattern to be read at this step. The matching pattern is prepared in advance in accordance with the number of screen lines to be used. In the present embodiment, the pattern 801 corresponds to 106 lines=FIG. 5A, the pattern 802 to 134 lines=FIG. 5C, the pattern 803 to 141 lines=FIG. 5B, and the pattern 804 to the 134-line mirror image=FIG. 5D, respectively. Then, these four kinds of matching patterns are configured by 27×27 pixels the same size as the determination buffer because of the distance between the pixels in the screen representation with K=254 in which dots are conspicuous in the high-density part (or the screen representation with K=1 in which dots are conspicuous in the low-density part). It is seen that positions B, C, D, and E in each matching pattern have corresponding points in the case where they are extended to the opposite side by the same distance with a center position A being sandwiched in between.

Explanation is returned to the flowchart in FIGS. 7A to 7D.

At step 704, the point-symmetry determination unit 202 compares the partial image read at step 701 and the matching pattern read at step 703 (or step 718).

At step 705, the point-symmetry determination unit 202 determines whether the color of all the pixels except for the pixel (notice pixel A) corresponding to the position A and the pixels corresponding to the positions B to E (reference pixels B to E) within the matching pattern of all the pixels within the partial image is white. In the case where it is determined that the color is white, the procedure proceeds to step 706. On the other hand, in the case where it is determined that the color is not white, the procedure proceeds to step 717.

At step 706, the point-symmetry determination unit 202 determines whether all the colors of the reference pixels B to E are white. In the case where it is determined that all the colors are white, the procedure proceeds to step 707. On the other hand, in the case where it is determined that all the colors are not white (black is included), the procedure proceeds to step 709.

At step 707, the point-symmetry determination unit 202 determines whether the color of the notice pixel A is black. In the case where it is determined that the color is black, the procedure proceeds to step 708. On the other hand, in the case where it is determined that the color is not black, the procedure proceeds to step 729.

Figure 9:
FIG. 9 is a diagram showing an example of an output pattern table according to a first embodiment.
Figure 9:
Figure 9:
Figure 9:
Figure 9:
Figure 9:
Figure 9:
Figure 9:
Figure 9:
Figure 9:
Figure 9:
Figure 9:

At step 708, the point-symmetry determination unit 202 reads a black output pattern A (pattern in which only the pixel at the top-left end of all the four (2×2) pixels is black) from the output pattern table held in the RAM 103 and overwrites the above-mentioned output candidate buffer by it. After overwriting is completed, the procedure proceeds to step 729. FIG. 9 is an example of the output pattern table showing all the output patterns including the above-mentioned black output pattern A. In the table in FIG. 9, 12 output patterns including a black default and a white default are shown. In the present embodiment, it is assumed that each output pattern is created so that the density value in the input image data is maintained at the level specified by the signal also in the output image data.

At step 709, the point-symmetry determination unit 202 determines whether both the two pixels of one of the reference pixels B and the reference pixels C are black. In the case where it is determined that both the two pixels of at least one of the reference pixels B and the reference pixels C are black, the procedure proceeds to step 710. On the other hand, in the case where it is determined that neither the two pixels of the reference pixels B nor the two pixels of the reference pixels C are black, the procedure proceeds to step 713.

At step 710, the point-symmetry determination unit 202 determines whether the color of the notice pixel A is black. In the case where it is determined that the color is black, the procedure proceeds to step 711. On the other hand, in the case where it is determined that the color is not black, the procedure proceeds to step 712.

At step 711, the point-symmetry determination unit 202 reads a black output pattern BCA (pattern in which the two pixels on the upper half side of all the four (2×2) pixels are black) from the output pattern table held in the RAM 103 and overwrites the output candidate buffer by it. After overwriting is completed, the procedure proceeds to step 713.

At step 712, the point-symmetry determination unit 202 reads a black output pattern BC (pattern in which only the pixel at the top-left end of all the four (2×2) pixels is black) from the output pattern table held in the RAM 103 and overwrites the output candidate buffer by it. After overwriting is completed, the procedure proceeds to step 713.

At step 713, the point-symmetry determination unit 202 determines whether both the two pixels of one of the reference pixels D and the reference pixels E are black. In the case where it is determined that both the two pixels of at least one of the reference pixels D and the reference pixels E are black, the procedure proceeds to step 714. On the other hand, in the case where it is determined that neither the two pixels of the reference pixels D nor the two pixels of the reference pixels E are black, the procedure proceeds to step 729.

At step 714, whether the color of the notice pixel A is black is determined. In the case where it is determined that the color is black, the procedure proceeds to step 715. On the other hand, in the case where it is determined that the color is not black, the procedure proceeds to step 716.

At step 715, the point-symmetry determination unit 202 reads a black output pattern DEA (pattern in which the three pixels of all the four (2×2) pixels except for one at the bottom-right end are black) from the output pattern table held in the RAM 103 and overwrites the output candidate buffer by it. After overwriting is completed, the procedure proceeds to step 729.

At step 716, the point-symmetry determination unit 202 reads a black output pattern DE (pattern in which only the pixel at the top-left end of all the four (2×2) pixels is black) from the output pattern table held in the RAM 103 and overwrites the output candidate buffer by it. After overwriting is completed, the procedure proceeds to step 729.

At step 717, the point-symmetry determination unit 202 determines whether the color of all the pixels except the pixel (notice pixel A) corresponding to the position A and the pixels corresponding to the positions B to E (reference pixels B to E) within the matching pattern of all the pixels within the partial image is black. In the case where it is determined that the color is black, the procedure proceeds to step 718. On the other hand, in the case where it is determined that the color is not black, the procedure proceeds to step 729.

At step 718, the point-symmetry determination unit 202 determines whether all the colors of the reference pixels B to E are black. In the case where it is determined that all the colors are black, the procedure proceeds to step 719. On the other hand, in the case where it is determined that all the colors are not black (white is included), the procedure proceeds to step 721.

At step 719, the point-symmetry determination unit 202 determines whether the color of the notice pixel A is white. In the case where it is determined that the color is white, the procedure proceeds to step 720. On the other hand, in the case where it is determined that the color is not white, the procedure proceeds to step 729.

At step 720, the point-symmetry determination unit 202 reads a white output pattern A (pattern in which only the pixel at the top-left end of all the four (2×2) pixels is white) from the output pattern table held in the RAM 103 and overwrites the output candidate buffer by it. After overwriting is completed, the procedure proceeds to step 729.

At step 721, the point-symmetry determination unit 202 determines whether both the two pixels of one of the reference pixels B and the reference pixels C are white. In the case where it is determined that both the two pixels of at least one of the references B and the reference pixels C are white, the procedure proceeds to step 722. On the other hand, in the case where it is determined that neither the two pixels of the reference pixels B nor the two pixels of the reference pixels C are white, the procedure proceeds to step 725.

At step 722, the point-symmetry determination unit 202 determines whether the color of the notice pixel A is white. In the case where it is determined that the color is white, the procedure proceeds to step 723. On the other hand, in the case where it is determined that the color is not white, the procedure proceeds to step 724.

At step 723, the point-symmetry determination unit 202 reads a white output pattern BCA (pattern in which the two pixels on the upper half side of all the four (2×2) pixels are white) from the output pattern table held in the RAM 103 and overwrites the output candidate buffer by it. After overwriting is completed, the procedure proceeds to step 725.

At step 724, the point-symmetry determination unit 202 reads a white output pattern BC (pattern in which only the pixel at the top-left end of all the four (2×2) pixels is white) from the output pattern table held in the RAM 103 and overwrites the output candidate buffer by it. After overwriting is completed, the procedure proceeds to step 725.

At step 725, the point-symmetry determination unit 202 determines whether both the two pixels of one of the reference pixels D and the reference pixels E are white. In the case where it is determined that both the two pixels of at least one of the reference pixels D and the reference pixels E are white, the procedure proceeds to step 726. On the other hand, in the case where neither the two pixels of the reference pixels D and nor the two pixels of the reference pixels E are white, the procedure proceeds to step 729.

At step 726, the point-symmetry determination unit 202 determines whether the color of the notice pixel A is white. In the case where it is determined that the color is white, the procedure proceeds to step 727. On the other hand, in the case where it is determined that the color is not white, the procedure proceeds to step 728.

At step 727, the point-symmetry determination unit 202 reads a white output pattern DEA (pattern in which the three pixels of all the four (2×2) pixels except for one at the bottom-right end are white) from the output pattern table held in the RAM 103 and overwrites the output candidate buffer by it. After overwriting is completed, the procedure proceeds to step 729.

At step 728, the point-symmetry determination unit 202 reads a white output pattern DE (pattern in which only the pixel at the top-left end of all the four (2×2) pixels is white) from the output pattern table held in the RAM 103 and overwrites the output candidate buffer by it. After overwriting is completed, the procedure proceeds to step 729.

At step 729, the point-symmetry determination unit 202 determines whether the comparison with all the matching patterns prepared in advance is made for the partial image. In the case where the comparison with all the matching patterns is not completed yet, the procedure returns to step 703 and the next matching pattern is read, and the processing at step 704 and subsequent steps is repeated. In the present embodiment, the four kinds of matching patterns are prepared in advance, and therefore, the processing at step 703 to step 729 is repeated four times as a result. On the other hand, in the case where the comparison with all the matching patterns is completed, the procedure proceeds to step 730.

At step 730, the pixel replacement processing unit 203 produces an output after replacing the notice pixel with the output pattern stored within the output candidate buffer.

In the flowchart in FIGS. 7A to 7D, the comparison with a plurality of matching patterns is made one by one in order. However, the matching pattern differs in accordance with the number of lines and it is unlikely that a plurality of matching patterns agrees at the same time. Because of that, it may also be possible to perform the processing to compare with the partial image parallelly.

The above is the flow of the point-symmetry determination processing and the pixel replacement processing.

For example, in the case where the point-symmetry determination processing and the pixel replacement processing are performed on the binary image shown in FIGS. 6A and 6B, images as below are output finally, respectively, as a result.

(In the Case of Binary Image in FIG. 6A)

First, in the case where the notice pixel is in positions a, c, i, k, in all the matching patterns 801 to 804, the determination result is Yes at step 705 to step 707. Consequently, in the output candidate buffer, the black output pattern A is stored (step 708).

In the case where the notice pixel is in positions b, d, j, l, in the comparison with the matching pattern 801, it is determined that both the two pixels of the reference pixels E are black at step 713 after steps 705, 706, and 709. Then, at subsequent step 714, it is determined that the notice pixel A is white. Consequently, in the output candidate buffer, the black output pattern DE is stored (step 716).

In the case where the notice pixel is in positions e, g, m, o, in the comparison with the matching pattern 801, it is determined that both the two pixels of the reference pixels D are black at step 713 after steps 705, 706, and 709. Then, at subsequent step 714, it is determined that the notice pixel A is white. Consequently, in the output candidate buffer, the black output pattern DE is stored (step 716).

In the case where the notice pixel is in positions f, h, n, p, in the comparison with the matching pattern 801, it is determined that both the two pixels of the reference pixels B and both the two pixels of the reference pixels C are black at step 709 after steps 705 and 706. Then, at subsequent step 710, it is determined that the notice pixel A is white. Consequently, in the output candidate buffer, the black output pattern BC is stored (step 712).

In the case where the notice pixel is in positions other than the above-mentioned positions, any of black output patters is not stored in the output candidate buffer, and therefore, the output candidate buffer has the value initialized at step 702, that is, the output candidate buffer remains in the state of being filled with white.

Figure 10A:
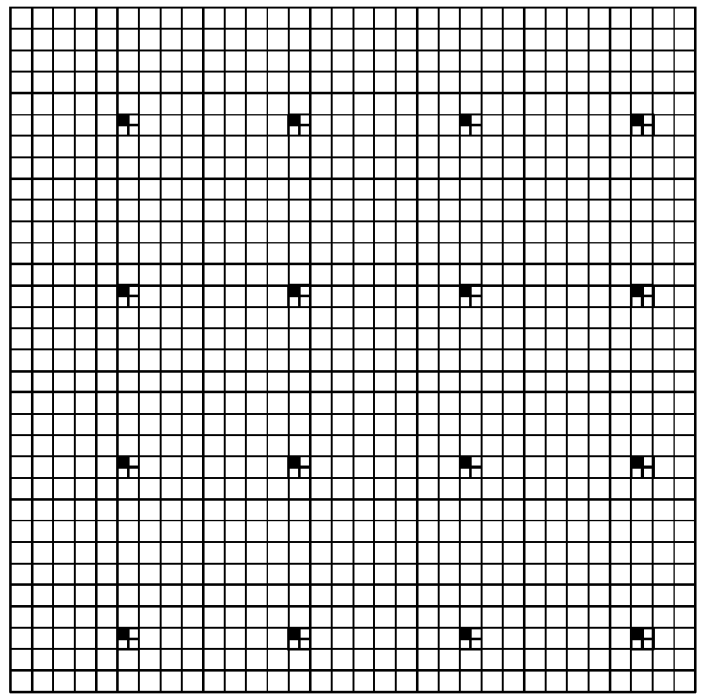
FIGS. 10A and 10B are diagrams showing an example of an output image in the case where the first embodiment is applied.

By the above-mentioned processing, the four black dots (a, c, i, k) of the binary image shown in FIG. 6A are output finally in the state as shown in FIG. 10A. That is, the four black dots are divided into smaller dots and the divided dots are arranged dispersedly (here, arranged in the positions most distant from one another) and output.

(In the Case of Binary Image in FIG. 6B)

First, in the case where the notice pixel is in the positions a, c, i, k, for all the matching patterns 801 to 804, the determination result is Yes at step 717 to step 719 after No at step 705. Consequently, in the output candidate buffer, the white output pattern A is stored (step 720).

In the case where the notice pixel is in the positions b, d, j, l, in the comparison with the matching pattern 801, it is determined that both the two pixels of the reference pixels E are white at step 725 after steps 705, 717, 718, and 721. Then, at subsequent step 726, it is determined that the notice pixel A is black. Consequently, in the output candidate buffer, the white output pattern DE is stored (step 728).

In the case where the notice pixel is in the positions e, g, m, o, in the comparison with the matching pattern 801, it is determined that both the two pixels of the reference pixels D are white at step 725 after steps 705, 717, 718, and 721. Then, at subsequent step 726, it is determined that the notice pixel A is black. Consequently, in the output candidate buffer, the white output pattern DE is stored (step 728).

In the case where the notice pixel is in the positions f, h, n, p, in the comparison with the matching pattern 801, it is determined that both the two pixels of the reference pixels B and both the two pixels of the reference pixels C are white at step 721 after steps 705, 717, and 718. Then, at subsequent step 722, it is determined that the notice pixel A is black. Consequently, in the output candidate buffer, the white output pattern BC is stored (step 724).

In the case where the notice pixel is in positions other than the above-mentioned positions, any of white output patters is not stored in the output candidate buffer, and therefore, the output candidate buffer has the value initialized at step 702, that is, output candidate buffer remains in the state of being filled with black.

Figure 10B:
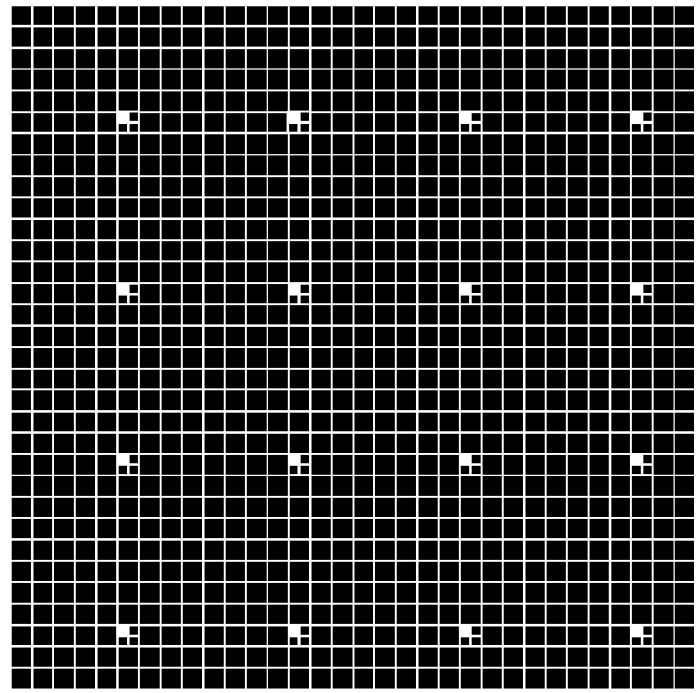

By the above-mentioned processing, the four white dots (a, c, i, k) of the binary image shown in FIG. 6B are divided finally into smaller dots as shown in FIG. 10B and output in the state where each dot is arranged in a position most distant from one another.

In the present embodiment, the case is explained where the input image data is output with the resolution doubled in both the vertical direction and the horizontal direction, but, the present embodiment is not limited to this. For example, it is also possible to apply the present embodiment to the case where the output is produced with the resolution doubled only in one of the vertical and horizontal directions, or the case where the output is produced with the resolution quadrupled in both the vertical direction and the horizontal direction. In this case, the number of pixels etc. of the output pattern is changed appropriately in accordance with the resolution of the output image relative to that of the input image.

According to the invention of the present embodiment, the dots regularly aligned in the low-density part close to white and in the high-density part close to black in a binary image are divided and the divided dots are arranged dispersedly. Due to this, it is possible to prevent such a state where the dots are connected or the dots gather densely to be viewed as one dot.

(Second Embodiment)

In the first embodiment, the notice pixel is replaced with the output pattern with which the density is kept at the level specified by the signal. However, in the electrophotography, because of the overlap of laser spots and the gathering of peaks of potential, even in the case where the number of pixels is increased one by one, such as one pixel, two pixels, three pixels, and four pixels, it is unlikely that the dot actually printed changes considerably in a linear manner. In the case where the dot represented by four (2×2) pixels is divided into four pixels, the divided pixel is represented as a far smaller dot. Because of this, in the case where the method of the first embodiment is used, the state where dots are aligned and therefore conspicuous is eliminated, but, it can be thought that the apparent density in the output image before the dots are dispersed no longer agrees with that after the dots are dispersed (the density of the output image seems lower).

Because of the above, an aspect is explained as a second embodiment, in which an output pattern with which the apparent density at the time of input agrees with that at the time of output is adopted. Explanation of parts common to those of the first embodiment is simplified or omitted, and here, different points are explained mainly.

Figure 11:
FIG. 11 is a diagram showing an example of an output pattern table according to a second embodiment.
Figure 11:
Figure 11:
Figure 11:
Figure 11:
Figure 11:
Figure 11:
Figure 11:
Figure 11:
Figure 11:
Figure 11:
Figure 11:

FIG. 11 shows an example of an output pattern table according to the present embodiment. Compared to the output pattern table in FIG. 9 according to the first embodiment, the number of black pixels is increased by one in the black output pattern BCA and the black output pattern DE. In the present embodiment, it is assumed that a user rewrites the contents of the output pattern table via the operation unit 105.

Figure 12:
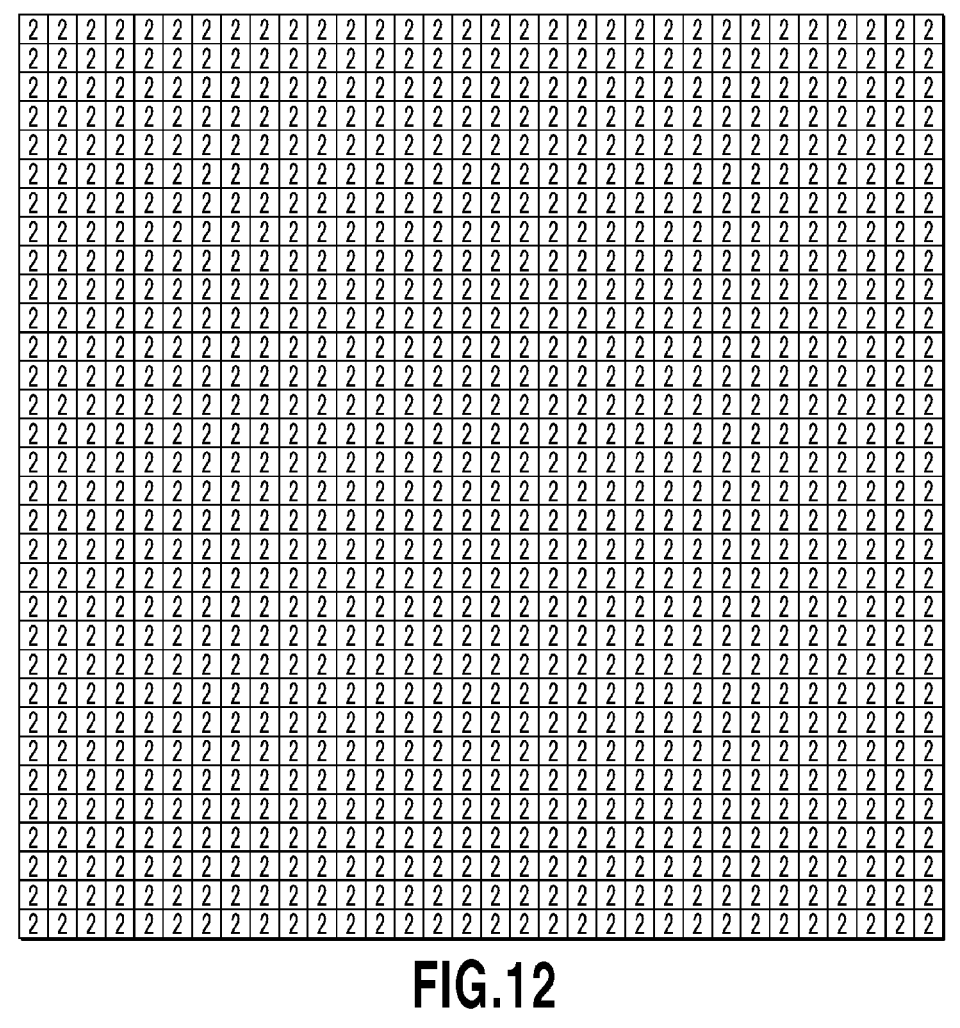
Figure 13:
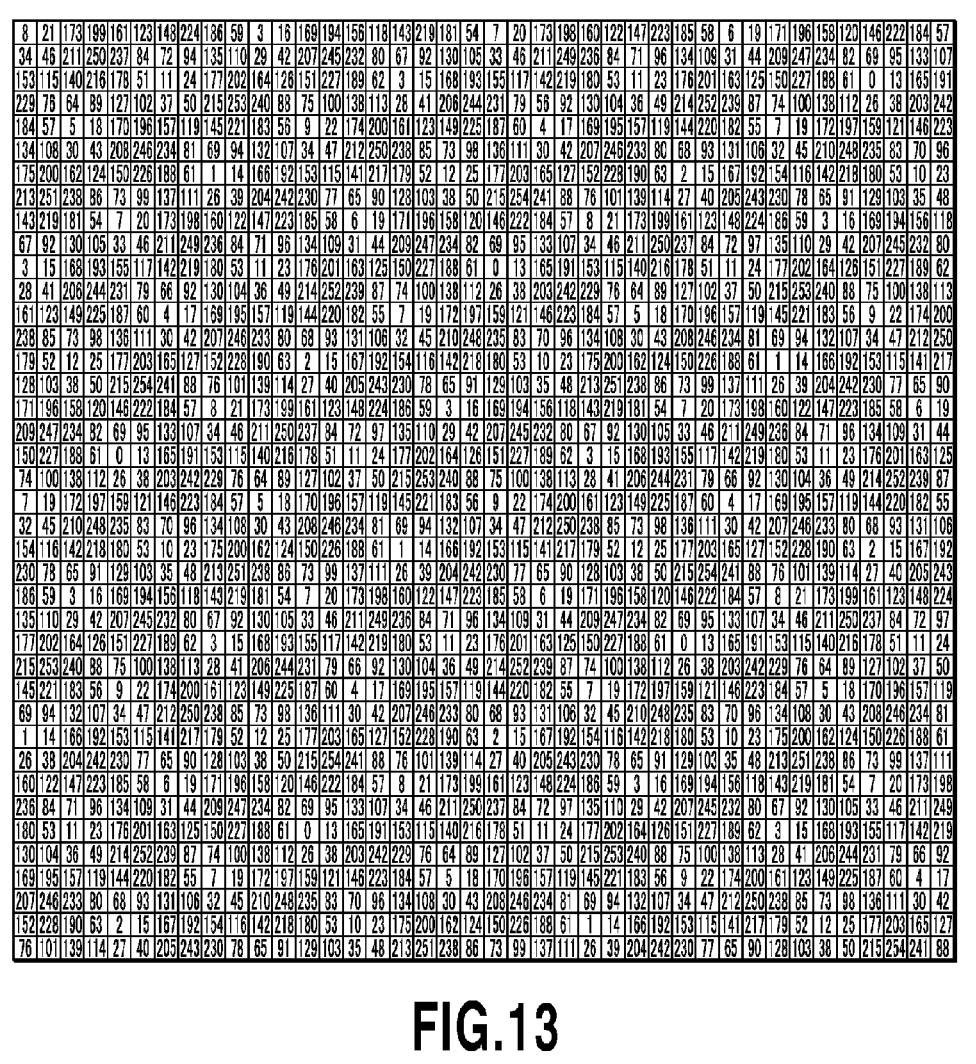

In the present embodiment, it is further assumed that the density value of the input image data is two (see FIG. 12) and in the binarization processing unit 201, a dither pattern shown in FIG. 13 is used.

Hereinafter, along the flowchart in FIGS. 3A and 3B described previously, image processing in the image processing unit 115 according to the present embodiment is explained.

Figure 14:
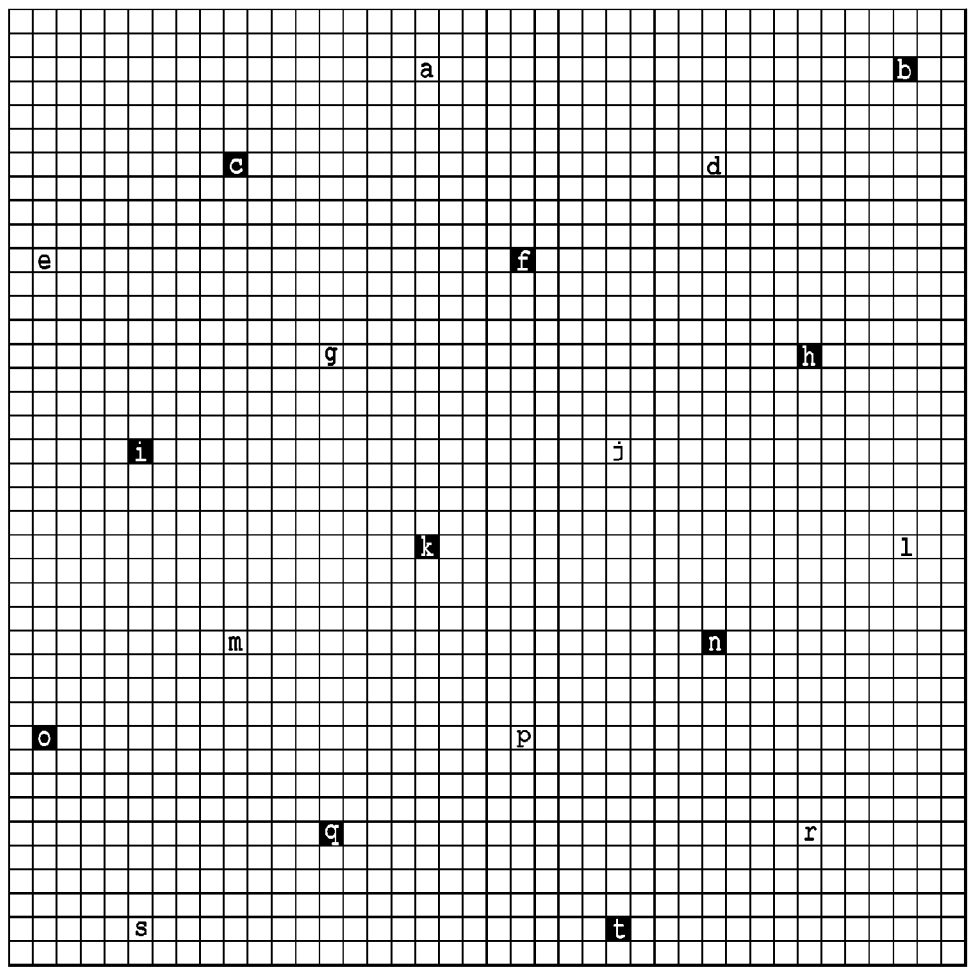
FIG. 14 is a diagram showing an example of a binary image obtained by performing binarization processing on input image data.

Upon receipt of the input image data shown in FIG. 12 (step 301), the image processing unit 115 performs binarization processing using the dither pattern shown in FIG. 13 and generates a binary image (step 302). In the case of the present embodiment, all the density values of the input image data is two, and therefore, only the parts where the threshold value is zero and one in the dither pattern shown in FIG. 13 are converted into ON (1) and other parts are converted into OFF (0). By this, a binary image as shown in FIG. 14 is obtained. As in the binary image shown in FIGS. 6A and 6B in the first embodiment, it is assumed that the actual binary image is represented by the repetition of this and has a sufficiently large area. Then, the processing at step 303 and subsequent steps is performed.

First, in the case where the notice pixel is in the positions a, d, e, g, j, l, m, p, r, s of the binary image in FIG. 14, in the comparison with the matching pattern 804 described previously, it is determined that the color of both the two pixels of the reference pixels D and both the two pixels of the reference pixels E is black and the color of the notice pixel A is white (steps 713, 714). Consequently, in the output candidate buffer, the black output pattern DE in the output pattern table shown in FIG. 11 is stored (step 716).

In the case where the notice pixel is in the positions b, c, f, h, i, k, n, o, q, t of the binary image in FIG. 14, in the comparison with the matching pattern 804 described previously, it is determined that the color of both the two pixels of the reference pixels C and both the two pixels of the reference pixels B is black and the color of the notice pixel A is black (steps 709, 710). Consequently, in the output candidate buffer, the black output pattern BCA in the output pattern table shown in FIG. 11 is stored (step 711).

In the case where the notice pixel is in positions other than the above-mentioned positions, any of black output patters is not stored in the output candidate buffer, and therefore, the output candidate buffer has the value initialized at step 702, that is, the output candidate buffer remains in the state of being filled with white.

Figure 15:
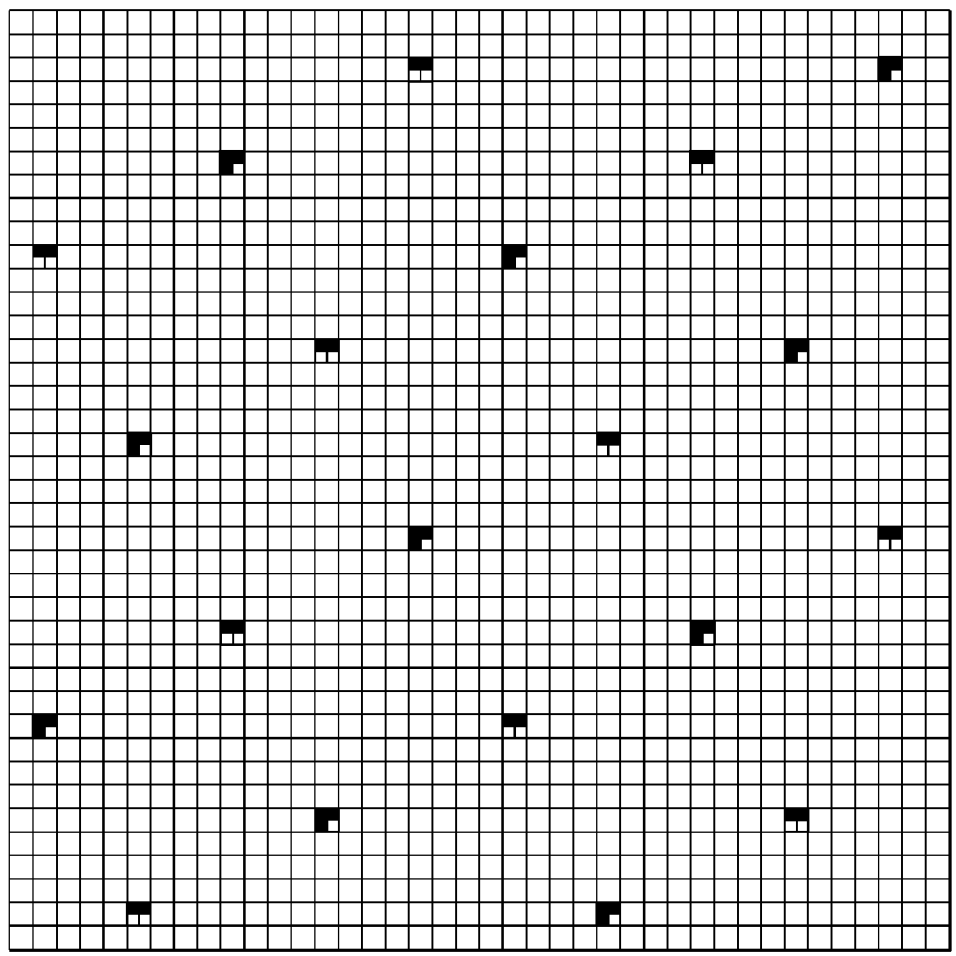
FIG. 15 is a diagram showing an example of an output image in the case where the second embodiment is applied.

Through the above-mentioned processing, the ten black dots (b, c, f, h, i, k, n, o, q, t) of the binary image shown in FIG. 14 are finally output in the state as shown in FIG. 15.

In this case, in the output image shown in FIG. 15, it seems that the number of black pixels increases compared to that in the binary image shown in FIG. 14 and the density is higher, but, the actual printing result shows the image with the density of the input image data being maintained.

(Third Embodiment)

In the case where black or white dots regularly aligned are not conspicuous in the bright part close to white or in the dark part close to black, it is not necessary to perform the replacement processing (division of the notice pixel and dispersed arrangement) explained in the first and second embodiments. Here, an aspect is explained as a third embodiment, in which it is possible to perform processing so that the notice pixel is maintained as it is in the replacement processing in response to the selection by a user. Explanation of parts common to those of the first and second embodiments is simplified or omitted and here, different points are explained mainly.

In the present embodiment, a user is enabled to select whether to maintain the notice pixel in the replacement processing (whether to perform division and dispersed arrangement) via the operation unit 105. Then, in the case where "Maintain notice pixel" is selected, the notice pixel is replaced with, for example, the output pattern consisting of only four pixels whose color is white (black) in the case where the color of the notice pixel is white (black). FIG. 16 is an example of the output pattern table according to the present embodiment. In the output pattern table in FIG. 16, for example, in the output pattern including black pixels, all the four pixels of the black output patterns A, BCA, and DEA are black pixels, and therefore, the notice pixel is maintained as a result.

Hereinafter, along the flowchart in FIGS. 3A and 3B described previously, image processing in the image processing unit 115 according to the present embodiment is explained. Here, it is assumed that the input image data shown in FIG. 4 (all the density values are one) is binarized using the dither pattern shown in FIG. 5A and the binary image shown in FIGS. 6A and 6B is generated. Of course, as in the first embodiment, the actual binary image is presented by the repetition of this and has a sufficiently large area. Then, the processing at step 303 and subsequent steps is performed.

First, in the case where the notice pixel is in the positions a, c, i, k, in all the matching patterns 801 to 804, the determination result is Yes at step 705 to step 707. Consequently, in the output candidate buffer, the black output pattern A in the output pattern table shown in FIG. 16 is stored (step 708).

In the case where the notice pixel is in the positions b, d, j, l, in the comparison with the matching pattern 801, it is determined that both the two pixels of the reference pixels E are black at step 713 after steps 705, 706, and 709. Then, at subsequent step 714, it is determined that the color of the notice pixel A is white. Consequently, in the output candidate buffer, the black output pattern DE in the output pattern table shown in FIG. 16 is stored (step 716).

In the case where the notice pixel is in the positions e, g, m, o, in the comparison with the matching pattern 801, it is determined that both the two pixels of the reference pixels D are black at step 713 after steps 705, 706, and 709. Then, at subsequent step 714, it is determined that the color of the notice pixel A is white. Consequently, in the output candidate buffer, the black output pattern DE in the output pattern table shown in FIG. 16 is stored (step 716).

In the case where the notice pixel is in the positions f, h, n, p, in the comparison with the matching pattern 801, it is determined that both the two pixels of the reference pixels B and both the two pixels of the reference pixels C are black at step 709 after steps 705 and 706. Then, at subsequent step 710, it is determined that the color of the notice pixel A is white. Consequently, in the output candidate buffer, the black output pattern BC in the output pattern table shown in FIG. 16 is stored (step 712).

In the case where the notice pixel is in positions other than the above-mentioned positions, any of black output patters is not stored in the output candidate buffer, and therefore, the output candidate buffer has the value initialized at step 702, that is, the output candidate buffer remains in the state of being filled with white.

Figure 17:
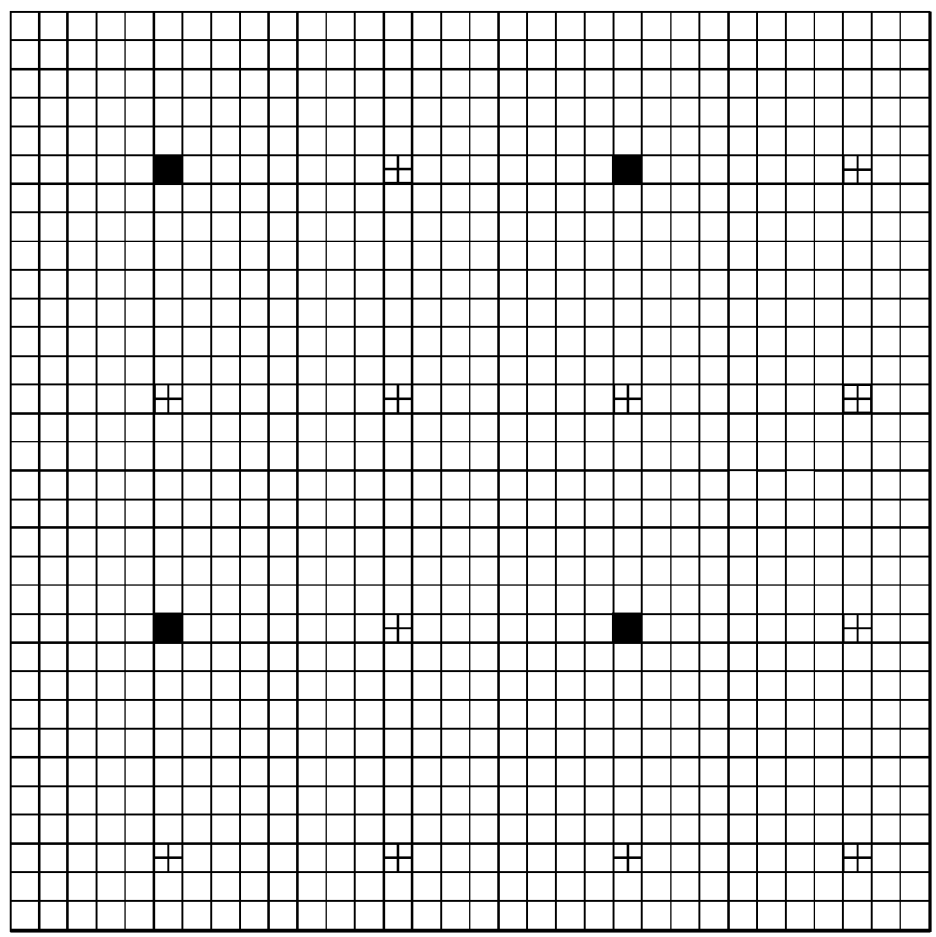
FIG. 17 is a diagram showing an example of an output image in the case where the third embodiment is applied.

By the above-mentioned processing, the binary image shown in FIGS. 6A and 6B is output in the same state as that of the input image without not finally being brought into the state as shown in FIG. 17, that is, the state where the dots are divided into smaller dots and the divided dots are arranged dispersedly as in the first embodiment.

(Other Embodiments)

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-170742, filed Aug. 1, 2012, which is hereby incorporated by reference herein in its entirety.

What is claimed is:

1. An image processing device comprising:
   an input unit configured to input an image;
   an obtaining unit configured to obtain a binary image by performing screen processing on the input image;
   a selecting unit configured to select pixels in the binary image one by one;
   a point-symmetry determination unit configured to determine whether or not pixels located at predetermined point-symmetric positions with respect to each selected pixel have the same colors; and
   a pixel replacement unit configured to replace each selected pixel with an output pattern with a resolution higher than that of the binary image in a case that the pixels located at the positions are determined to have the same colors.

2. The image processing device according to claim 1, wherein
   the point-symmetry determination unit performs the determination using pattern matching.

3. The image processing device according to claim 2, wherein
   matching patterns used in the pattern matching are prepared in a number corresponding to a number of screen lines.

4. The image processing device according to claim 1, wherein
   the pixel replacement unit arranges each pixel after replacement dispersedly.

5. The image processing device according to claim 1, wherein
   the output pattern with high resolution is set so that a density in the input image data and a density of image data after the replacement are equal.

6. The image processing device according to claim 5, wherein
   the density is a density at a level specified by a signal.

7. The image processing device according to claim 5, wherein
   the density is an apparent density.

8. The image processing device according to claim 1, wherein
   the pixel replacement unit arranges each pixel after replacement dispersedly or arranges so as to maintain the selected pixel in accordance with selection by a user.

9. An image processing method comprising the steps of:
   an input step configured to input an image;
   an obtaining step configured to obtain a binary image by performing screen processing on the input image;
   a selecting step configured to select pixels in the binary image one by one
   a determining step configured to determine whether or not pixels located at predetermined point-symmetric positions with respect to each selected pixel have the same colors; and
   a replacing step configured to replace each selected pixel with an output pattern with a resolution higher than that of the binary image in a case that the pixels located at the positions are determined to have the same colors.

10. A non-transitory computer readable storage medium storing a program for causing a computer to perform the image processing method according to claim 9.

* * * * *